US010310123B2

(12) United States Patent
Xu et al.

(10) Patent No.: US 10,310,123 B2
(45) Date of Patent: *Jun. 4, 2019

(54) SEISMIC REFLECTION FULL WAVEFORM INVERSION FOR REFLECTED SEISMIC DATA

(71) Applicant: CGGVERITAS SERVICES SA, Massy Cedex (FR)

(72) Inventors: Sheng Xu, Katy, TX (US); Feng Chen, Pearland, TX (US); Gilles Lambare, Saint Fargeau Ponthierry (FR); Yu Zhang, Katy, TX (US)

(73) Assignee: CGG SERVICES SAS, Massy (FR)

( * ) Notice: Subject to any disclaimer, the term of this patent is extended or adjusted under 35 U.S.C. 154(b) by 1327 days.

This patent is subject to a terminal disclaimer.

(21) Appl. No.: 13/787,884

(22) Filed: Mar. 7, 2013

(65) Prior Publication Data

US 2013/0238249 A1    Sep. 12, 2013

Related U.S. Application Data

(60) Provisional application No. 61/608,903, filed on Mar. 9, 2012.

(51) Int. Cl.
*G01V 1/38* (2006.01)
*G01V 1/30* (2006.01)

(52) U.S. Cl.
CPC ............ *G01V 1/3808* (2013.01); *G01V 1/303* (2013.01); *G01V 1/38* (2013.01)

(58) Field of Classification Search
CPC ......... G01V 1/303; G01V 1/38; G01V 1/3808

(Continued)

(56) References Cited

U.S. PATENT DOCUMENTS 5,587,968 A * 12/1996 Barr ...................... G01V 1/303
    367/54
5,671,136 A * 9/1997 Willhoit, Jr. ........... G01V 1/30
    702/18

(Continued)

FOREIGN PATENT DOCUMENTS

WO    WO 2011031874 A1 *  3/2011  ............. G01V 1/303

OTHER PUBLICATIONS

Samuel H. Gray, True-amplitude seismic migration: A comparison of three approaches, May-Jun. 1997, Geophysics, vol. 62, No. 3, pp. 929-936.*

(Continued)

*Primary Examiner* — Mischita L Henson
(74) *Attorney, Agent, or Firm* — Patent Portfolio Builders PLLC

(57) ABSTRACT

A system and method are described herein for generating a velocity model of returned seismic signals for under-ocean floor environments. The system and method generate a series of source signals, receive a corresponding set of direct signals, reflected signals, and refracted signals, solve a velocity model equation using a full waveform inversion function with respect to the received set of direct signals, reflected signals and refracted signals to minimize a least square misfit function by relaxing a dependency on low frequency reflections in the full waveform inversion function. The system and method then generate the velocity model based on the solution to the velocity model equation, and display the velocity model.

24 Claims, 11 Drawing Sheets

(58) Field of Classification Search
USPC .................. 702/18; 367/43, 73, 54, 19, 75
See application file for complete search history.

(56) References Cited

U.S. PATENT DOCUMENTS

| | | | | |
|---|---|---|---|---|
| 5,757,722 | A * | 5/1998 | Zinn | G01S 1/74 367/19 |
| 6,208,587 | B1 * | 3/2001 | Martin | G01V 1/288 367/41 |
| 6,807,489 | B2 * | 10/2004 | Naville | G01V 1/42 702/17 |
| 8,422,335 | B2 * | 4/2013 | Shin | G01V 1/303 367/38 |
| 8,737,165 | B2 * | 5/2014 | Halliday | G01V 1/364 367/21 |
| 8,838,392 | B2 * | 9/2014 | Halliday | G01V 1/366 367/40 |
| 8,849,574 | B2 * | 9/2014 | Lomask | G01V 1/30 702/11 |
| 9,075,159 | B2 * | 7/2015 | Washbourne | G01V 1/30 |
| 9,075,163 | B2 * | 7/2015 | Robertsson | G01V 1/366 |
| 2003/0086335 | A1 * | 5/2003 | Naville | G01V 1/42 367/58 |
| 2004/0073370 | A1 * | 4/2004 | Dasgupta | G01V 1/42 702/6 |
| 2006/0197532 | A1 * | 9/2006 | Eidesmo | G01V 11/00 324/334 |
| 2009/0267608 | A1 * | 10/2009 | Johnstad | G01V 3/12 324/337 |
| 2009/0279387 | A1 * | 11/2009 | Tenghamn | G01V 1/3808 367/21 |
| 2010/0045295 | A1 * | 2/2010 | Mittet | G01V 1/38 324/334 |
| 2010/0265797 | A1 * | 10/2010 | Robertsson | G01V 1/366 367/43 |
| 2010/0322032 | A1 * | 12/2010 | Shin | G01V 1/303 367/43 |
| 2011/0082646 | A1 * | 4/2011 | Halliday | G01V 1/366 702/16 |
| 2012/0081999 | A1 * | 4/2012 | Halliday | G01V 1/364 367/24 |
| 2012/0243373 | A1 * | 9/2012 | Shin | G01V 1/282 367/73 |
| 2012/0314538 | A1 * | 12/2012 | Washbourne | G01V 1/30 367/49 |
| 2012/0316790 | A1 * | 12/2012 | Washbourne | G01V 1/307 702/14 |
| 2013/0030710 | A1 * | 1/2013 | Lomask | G01V 1/30 702/17 |
| 2014/0236487 | A1 * | 8/2014 | Kimman | G01V 1/364 702/18 |

OTHER PUBLICATIONS

Guy Chavent et al., "Automatic Determination of Velocities Via Migration-Based Traveltime Waveform Inversion: A Synthetic Data Example", SEG Expanded Abstracts 13, 1994, pp. 1179-1182.
Guy Chavent et al., "Mise en Oeuvre de la Methode MBTT pour un Modele Acoustique Par Differences Finies", Institut National De Recherche En Informatique Et En Automatique (INRIA), No. 2860, Avril 1996, INRIA-00073831, version 1, May 24, 2006.
Francois Clement et al., "Migration-Based Traveltime Waveform Inversion of 2-D Simple Structures: A Synthetic Example", Geophysics, May-Jun. 2001, p. 845-860, vol. 66, No. 3.
S. Choi et al., "Frequency Domain Elastic Full Waveform Inversion Using the New Pseudo-Hessian Matrix: Elastic Marmousi-2 Synthetic Test", SEG Technical Program Expanded Abstracts 2007, p. 1908-1912.
Odile Gauthier et al., "Two-Dimensional Nonlinear Inversion of Seismic Waveforms: Numerical Results", Geophysics, Jul. 1986, p. 1387-1403, vol. 51, No. 7.
Patrick Lailly, "The Seismic Inverse Problem as a Sequence of Before Stack Migrations", Proceedings of the international Conference on "Inverse Scattering, Theory and Applications", Tulsa, Oklahoma, 1983, pp. 206-220, SIAM Publisher.
J. P. Lindsey, "Elimination of Seismic Ghost Reflections by Means of a Linear Filter", Geophysics, Feb. 1960, p. 130-140, vol. XXV, No. 1.
Rene-Edouard Plessix et al, "Application of Acoustic Full Waveform Inversion to a Low-Frequency Large-Offset Land Data Set", SEG, p. 930-934, Expanded Abstracts, 29, 1, SEG Denver 2010 Annual Meeting.
Rene-Edouard Plessix et al, "VTI Full Waveform Inversion: A Parameterization Study with a Narrow Azimuth Streamer Data Example", SEG, p. 962-966, Expanded Abstracts, SEG Denver 2010 Annual Meeting.
Rene-Edouard Plessix et al, "Waveform Inversion of Reflection Seismic Data for Kinematic Parameters by Local Optimization", Siam Journal on Scientific Computing, 1999, p. 1033-1052, vol. 20, No. 3, Society for Industrial and Applied Mathematics.
R. Gerhard Pratt et al., "Gauss-Newton and Full Newton Methods in Frequency-Space Seismic Waveform Inversion", Geophysical Journal, International, 1998, p. 341-362, 133.
C. Ravaut et al., "Multiscale Imaging of Complex Structures from Multifold Wide-Aperture Seismic Data by Frequency-Domain Full-Waveform Tomography: Application to a Thrust Belt", Geophysical Journal, International, 2004, p. 1032-1056, 159.
Laurent Sirgue et al., "Efficient Waveform Inversion and Imaging: A Strategy for Selecting Temporal Frequencies", Geophysics, Jan.-Feb. 2004, p. 231-248, vol. 69, No. 1.
L. Sirgue et al., "Full Waveform Inversion: The Next Leap Forward in Imaging at Valhall", First Break, Apr. 2010, p. 65-70, vol. 28.
W. Symes et al., "Velocity Inversion by Differential Semblance Optimization", Geophysics, May 1991, p. 654-663, vol. 56, No. 5.
Albert Tarantola, "Inversion of Seismic Reflection Data in the Acoustic Appromixation", Geophysics, Aug. 1984, p. 1259-1266, vol. 49, No. 8.
J. Virieux et al., "An Overview of Full-Waveform Inversion in Exploration Geophysics", Geophysics, Nov.-Dec. 2009, p. WCC1-WCC2 , vol. 74, No. 6.
Yu Zhang et al., "True-Amplitude, Angle-Domain, Common-Image Gathers from One-Way Wave-Equation Migrations", Geophysics, Jan.-Feb. 2007, p. S49-S-58, vol. 72, No. 1.
"Velocity Model Building", ion GX Technology, Aug. 13-17, 2012.
Yong Ma et al., "A Projected Hessian Matrix for Full Waveform Inversion", SEG, Expanded Abstracts, 30, 1, p. 2401-2405, Sep. 18-23, 2011.

* cited by examiner

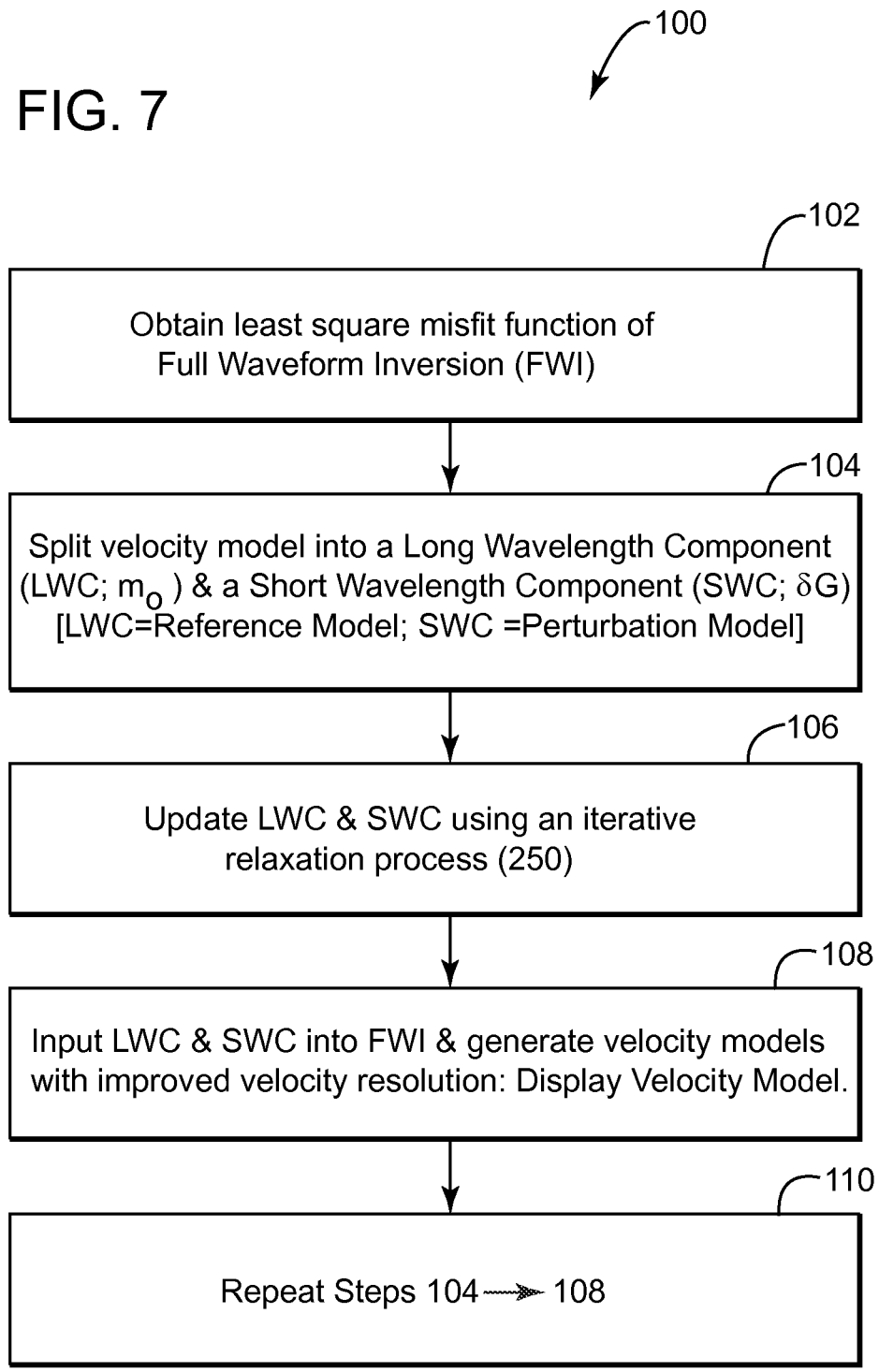

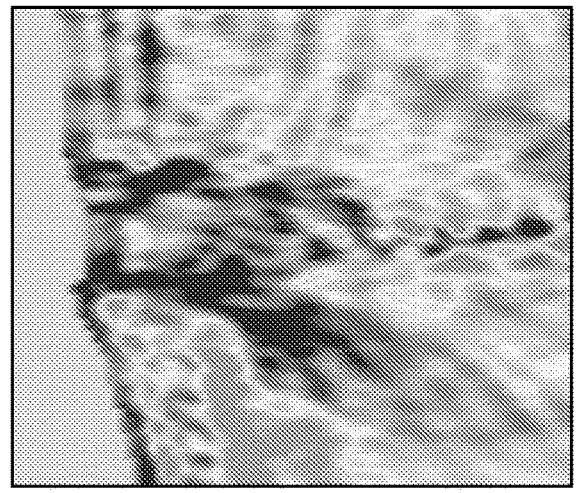
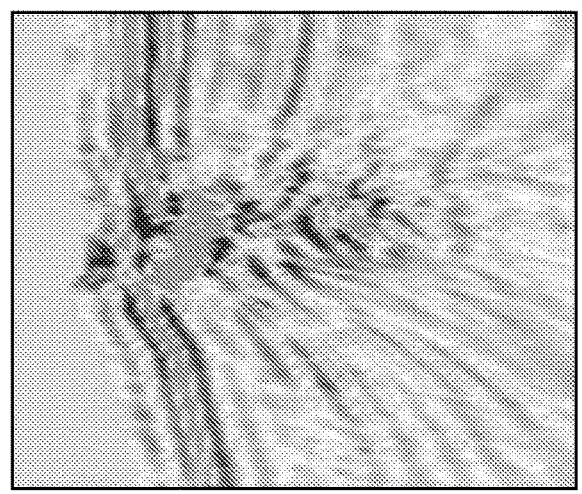
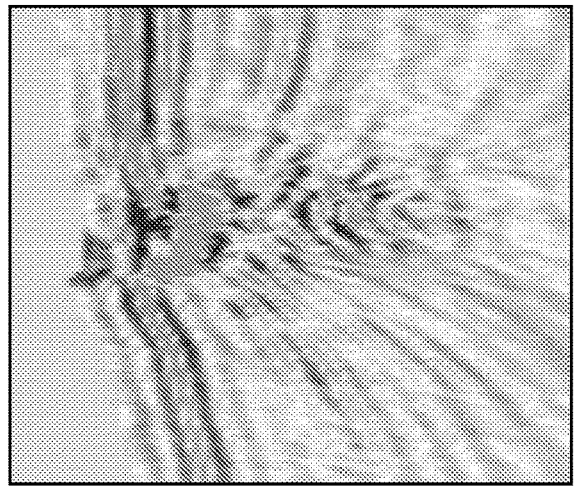

US 10,310,123 B2

SEISMIC REFLECTION FULL WAVEFORM INVERSION FOR REFLECTED SEISMIC DATA

DOMESTIC PRIORITY INFORMATION

The present application claims priority under 35 U.S.C. § 119(e) to U.S. Provisional Patent Application Ser. No. 61/608,903, filed Mar. 9, 2012, the entire contents of which are expressly incorporated herein by reference.

TECHNICAL FIELD

The embodiments disclosed herein relate generally to underwater seismic exploration, and more specifically to systems and methods for improving the application of full waveform inversion to streamer data to obtain better velocity resolution.

BACKGROUND

A widely used technique for searching for oil or gas is the seismic exploration of subsurface geophysical structures. The seismic exploration process consists of generating seismic waves (i.e., sound waves) directed toward the subsurface area, gathering data on reflections of the generated seismic waves at interfaces between layers of the subsurface, and analyzing the data to generate a profile (image) of the geophysical structure, i.e., the layers of the investigated subsurface. This type of seismic exploration can be used both on the subsurface of land areas and for exploring the subsurface of the ocean floor.

It is known by those of ordinary skill in the art of seismic exploration that an appropriate choice of frequencies to drive a sound producing device can be used to generate seismic waves whose reflections can, in turn, be used to determine the possible or probable location of hydrocarbon deposits under, e.g., the ocean floor. The sound producing device in such marine applications can be referred to as a marine vibrator, and is generally also called a "source," i.e., a source of the sound waves that are transmitted and then reflected/refracted off the ocean floor and then received by one or more, usually dozens, of receivers. Marine vibrators (herein after referred to as "vibrators," "marine vibrators," and/or "seismic vibrators") can be implemented in what are referred to as "towed arrays" of the plurality of sources and their receivers, wherein each towed array can include numerous vibrators, numerous receivers, and can include several or more groups of receivers, each on its own cables, with a corresponding source, again on its own cable. Systems and methods for their use have been produced for devices that can maintain these cables, for example, in relatively straight lines as they are being towed behind ships in the ocean. As those of ordinary skill in the art can appreciate, an entire industry has been created to explore the oceans for new deposits of hydrocarbons, and has been referred to as "reflection seismology."

For a seismic gathering process, as shown in FIG. 1, a data acquisition system 10 includes a ship 2 towing plural streamers 6 that may extend over kilometers behind ship 2. Each of the streamers 6 can include one or more birds 13 that maintains streamer 6 in a known fixed position relative to other streamers 6, and the birds 13 are capable of moving streamer 6 as desired according to bi-directional communications birds 13 can receive from ship 2. One or more source arrays 4a,b may be also towed by ship 2 or another ship for generating seismic waves. Source arrays 4a,b can be placed either in front of or behind receivers 14 (shown in FIG. 2), or both behind and in front of receivers 14. The seismic waves generated by source arrays 4a,b propagate downward, reflect off of, and penetrate the seafloor, wherein the refracted waves eventually are reflected by one or more reflecting structures (not shown in FIG. 1) back to the surface (see FIG. 2, discussed below). The reflected seismic waves propagate upwardly and are detected by receivers 14 provided on streamers 6. This process is generally referred to as "shooting" a particular seafloor area, and the seafloor area can be referred to as a "cell," and the underground area can be referred to as the "geographical area of interest" (GAI).

FIG. 2 illustrates a side view of the data acquisition system 10 of FIG. 1. Ship 2, located on ocean surface 46, tows one or more streamers 6, that is comprised of cables 12, and a plurality of receivers 14. Shown in FIG. 2 are two source streamers, which include sources 4a,b attached to respective cables 12a,b. Each source 4a,b is capable of transmitting a respective sound wave, or transmitted signal 20a,b. For the sake of simplifying the discussion, but while not detracting at all from an understanding of the principles involved, only a first transmitted signal 20a will be discussed (even though some or all of source 4 can be simultaneously (or not) transmitting similar transmitted signals 20). First transmitted signal 20a travels through ocean 40 (note that ocean 40 need not necessarily be a saltwater body of water; it can also be a freshwater or brackish body of water) and arrives at first refraction/reflection point 22a. First reflected signal 24a from first transmitted signal 20a travels upward from ocean floor 42, back to receivers 14. As those of skill in the art can appreciate, whenever a signal—optical or acoustical—travels from one medium with a first index of refraction n1 and meets with a different medium, with a second index of refraction n2, a portion of the transmitted signal is reflected at an angle equal to the incident angle (according to the well-known Snell's law), and a second portion of the transmitted signal can be refracted (again according to Snell's law).

Thus, as shown in FIG. 2, first transmitted signal 20a generates first reflected signal 24a, and first refracted signal 26a. First refracted signal 26a travels through sediment layer 16 (which can be generically referred to as first subsurface layer 16) beneath ocean floor 42, and can now be considered to be a "new" transmitted signal, such that when it encounters a second medium at second refraction/reflection point 28a, a second set of refracted and reflected signals 32a and 30a, are subsequently generated. Further, as shown in FIG. 2, there happens to be a significant hydrocarbon deposit 44 within a third medium, or solid earth/rock layer 18 (which can be generically referred to as second subsurface layer 18). Consequently, refracted and reflected signals are generated by the hydrocarbon deposit, and it one of at least several purposes of data acquisition system 10 to generate data that can be used to discover such hydrocarbon deposits 44.

The signals recorded by seismic receivers 14 vary in time, having energy peaks that may correspond to reflectors between layers. In reality, since the sea floor and the air/water are highly reflective, some of the peaks correspond to multiple reflections or spurious reflections that should be eliminated before the geophysical structure can be correctly imaged. Primary waves suffer only one reflection from an interface between layers of the subsurface (e.g., first reflected signal 24a). Waves other than primary waves are known as multiples. As known by those of ordinary skill in the art, multiples can be generated in several different ways.

Velocity models are key components of seismic imaging, and consequently, to reservoir description and geo-mechanical analysis. As its name implies, a velocity model is a visual representation of the velocity of sound waves in different locations underground. Note that "underground" can mean in land-based areas, for example, within the continental United States, or underground under the ocean floor (but can also include the different velocities of the sound as it passed through different ocean water layers). Thus, as shown in FIG. 3, first sound wave 20a can have many different velocities as it travels from source 4a, through different water layers 41a-d, through different underground layers 16a-c, and is finally reflected and received by receivers (not shown in FIG. 3). As those of ordinary skill in the art can appreciate, in standard sea water conditions, the first velocity is in the order of about 1,500 meters-per-second (mps). FIG. 3, a greatly oversimplified view of a velocity model for a fictitious area, shows up to seven different velocity-constant layers. As shown, the layers are generally not flat, as shown in FIG. 4, which is an illustrative cross section of an actual thrust belt. A thrust belt is a geological formation caused by compressional tectonics, a natural process that ultimately results in the formation of large mountain ranges. As those of ordinary skill in the art can appreciate, thrust belts present both significant financial rewards as well as financial risk: significant oil and gas deposits can be found around thrust belts, but, not every thrust belt will exhibit the properties of oil and gas deposits, and so "bust" drillings can occur, at the cost of about ten million dollars or so per drilling.

If the sub-strata were more or less homogenous, the velocity model would be relatively easy to create (as shown, for example, in FIG. 3); however, it is known that there are many different geological factors that will make it very difficult to create accurate depictions of the velocity model. For example, some sub-surface areas have significant complex features such as strong velocity or anisotropic parameter variations or complex geological formations such as salt and basalt structures, heavily faulted zones, anisotropic environments due to sedimentation or fracturing (an anisotropic environment is one in which seismic waves move at higher or lower velocities depending upon whether they move in directions along or across rock bed layers), overthrusts, shallow gas, among others. The processing of the reflected and refracted sound waves, therefore, can become extremely complicated.

Those of ordinary skill in the art can appreciate that velocity can vary depending upon such things as lithology (the type of rock), and depth of burial, since rocks under pressure tend to have higher velocity. Further, it is common to use colors, or shading, to represent a rainbow scale of rock velocity. Thus, similarly colored areas exhibit similar velocities. According to one non-limiting example, a first color or colors—purples and/or blues—represent the lower velocities in the range of 3,000 to 3,500 meters per second. A third set of colors—reds, yellows and oranges—represent velocities that are about 6,000 meters per second. A second set of colors, for example green, represents velocities that are in the range of about 4,000-5,000 meters per second. As discussed above, seismic data is obtained by generating sound waves, and locating receivers, usually a large number of them (in the order of several hundred to several thousand depending on the location and the expected underground geological topology), to collect the data.

Full waveform inversion (FWI) has been an important method to build velocity models for seismic imaging (see, Tarantola, A., 1984, "Inversion of Seismic Reflection Data in the Acoustic Approximation: Geophysics," 49, 1259-1266; and Sirgue, L., and R. G. Pratt, 2004, "Efficient Waveform Inversion and Imaging: A strategy for Selecting Temporal Frequencies," Geophysics, 69, 231-248; and Virieux, J., and S. Operto, 2009, "An Overview of Full Waveform Inversion in Exploration Geophysics," Geophysics, 74(6), WCC127-WCC152, the entire contents of each of which are incorporated herein in their entirety). Classical FWI involves the minimization of a square misfit function between the calculated and observed data. Non-linear gradient based optimizations have also been used (see, Pratt, R., C. et al., 1998, "Gauss-Newton and Full Newton Methods in Frequency-Space Seismic Waveform Inversion," Geophysical Journal, International, 13, p. 341-362; Ravaut, C. et al., 2004, "Multi-scale Imaging of Complex Structures from Multifold Wide-Aperture Seismic Data by Frequency-Domain Full Waveform Tomography Application to a Thrust Belt," Geophysical Journal, International, 159, 3, p. 1032-1056; Sirgue, L., and R. G. Pratt, 2004, "Efficient waveform inversion and imaging: A Strategy for Selecting Temporal Frequencies," Geophysics, 69, 231-248; Choi et al., 2008 "Frequency-Domain Full Waveform Inversions Using the new Pseudo-Hessian Matrix: Experience of Elastic Marmuosi-2 Synthetic Data." Bulletin of the Seismological Society of America, 98, 2402-2415; Ma Y., et al., 2011, "A Projected Hessian Matrix for Full Waveform Inversion," SEG, Expanded Abstracts, 30, 1, 2401-2405, the entire contents of each of which are incorporated herein in their entirety) with complex strategies for making the results more linear (filtering, weighting, and muting of the data, among other data manipulations). These strategies mitigate non-linearity but cannot recover the features that are not covered by the intrinsic resolution of the method.

The resolution of FWI is the resolution of a migration operator. The recovered wavelengths in the velocity model correspond to the time recorded wavelengths stretched to depth according to the local velocity and angular aperture. For the transmissions and refractions, the stretching due to the angle aperture allows recovery of the long wavelengths of the velocity model (see, Gauthier, O. et al, 1986, "Two-Dimensional Nonlinear Inversion of Seismic Waveforms: Numerical Results," Geophysics, 51, no. 7, p. 1387-1403, the entire contents of which are incorporated herein by reference), while for the reflections, only short wavelengths can be recovered by FWI due to the narrow range of reflection angle apertures. This explains why FWI recovers long wavelength components of the velocity model only in shallow areas and why its resolution improves when lower frequencies and longer offset data are available (see, Ravaut, C. et al., 2004, "Multiscale Imaging of Complex Structures from Multifold Wide-Aperture Seismic Data by Frequency-Domain Full Waveform Tomography: Application to a Thrust Belt" Geophysical Journal, International, 159, 3, p. 1032-1056, and Sirgue, L., et al., 2010, "Full-Waveform Inversion: The Next Leap Forward in Imaging at Valhall: First Break," 28, 65-70, the entire contents of all of which are incorporated herein by reference). Unfortunately for conventional streamer data, low frequencies are not available due to the existence of source and receiver ghosts (see, Lindsey, J. P., 1960, "Elimination of Seismic Ghost Reflections by Means of a Linear Filter," Geophysics, 25, 1, p. 130-140, the entire contents of which are incorporated herein by reference), and the maximum offset is usually limited to within about 8 km.

The aforementioned problems mean that it remains a challenge in the application of FWI to streamer data to obtain good velocity resolution. These problems have been discussed in Plessix, R. E. et al, 2010, "Application of Acoustic Full Waveform Inversion to a Low-Frequency Large-Offset Land Data Set," SEG, Expanded Abstracts, 29, 1, p. 930-934, the entire contents of which are incorporated herein by reference. Accordingly, it would be desirable to provide methods, modes and systems for improving the application of FWI to streamer data to obtain better velocity resolution.

SUMMARY

An object of the embodiments is to substantially solve at least the problems and/or disadvantages discussed above, and to provide at least one or more of the advantages described below.

It is therefore a general aspect of the embodiments to provide a system and method for improving the application of FWI to streamer data to obtain better velocity resolution that will obviate or minimize problems of the type previously described.

According to a first aspect of the embodiments, a method is provided for generating a velocity model of returned seismic signals for under-ocean floor environments, the method comprising generating a series of source signals, receiving a corresponding set of direct signals, reflected signals, and refracted signals, solving a velocity model equation using a full waveform inversion function with respect to the received set of direct signals, reflected signals and refracted signals to minimize a least square misfit function by relaxing a dependency on low frequency reflections in the full waveform inversion function, generating the velocity model based on the solution to the velocity model equation, and displaying the velocity model.

According to the first aspect, the step of relaxing the dependency on low frequency reflections comprises updating long wavelength components of the full waveform inversion function generated velocity model affecting the received reflected signals, and further wherein the step of relaxing the dependency on low frequency reflections comprises, implementing a non-linear iterative relaxation process, wherein the step of implementing includes obtaining the long wavelength components of the received reflected signals, updating the short wavelength components using the long wavelength components, fixing the short wavelength components, updating the long wavelength components using the fixed short wavelength components, and using the updated short wavelength component and updated long wavelength components to generate the updated velocity model.

Still further according to the first aspect, the step of updating the short wavelength components using the long wavelength components comprises using a true amplitude migration process, and the step of using a true amplitude migration process comprises evaluating the following expression—

$$\frac{\partial \delta G}{\partial m_0}\bigg|_{\delta m}(m_0, \delta m)(r, \omega, s; x) = $$
$$\omega^2 \int dy \left( \frac{\partial G_0}{\partial m_0}(r, \omega; y) G(y, \omega; s) + G_0(r, \omega; y) \frac{\partial G}{\partial m_0}(y, \omega; s) \right) \delta m(y).$$

According to the first aspect, the step of updating the long wavelength components using the fixed short wavelength components comprises using a local optimization scheme, and the step of using the local optimization scheme comprises evaluating the following expressions—

$$R(r, \omega; s) = G_{obs}(r, \omega; s) - G_{cal}(r, \omega; s),$$

and $$\frac{\partial C}{\partial m_0}\bigg|_{\delta m}(x) = -\int\int dsdr \int d\omega \frac{\partial \delta G}{\partial m_0(x)}\bigg|_{\delta m}^{*}(r, \omega, s; x) R(r, \omega; s).$$

According to a second aspect of the embodiments, a method for generating a velocity model of returned seismic signals for under-ocean floor environments is provided comprising generating a series of source signals, receiving a corresponding set of direct signals, reflected signals, and refracted signals, solving a velocity model equation using a full waveform inversion function with respect to the received set of direct signals, reflected signals and refracted signals to minimize a least square misfit function by splitting the full waveform inversion velocity model into long wavelength components of the received reflected signals, and short wavelength components of the received reflected signals, updating the short wavelength components of the received reflected signals, and long wavelength components of the received reflected signals using an iterative relaxation process, and generating an iterative velocity model based on the solution to the velocity model equation that includes the iterated long wavelength components of the received reflected signals and the iterated short wavelength components of the received reflected signals, and displaying the velocity model.

According to the second aspect, the step of splitting the full waveform inversion velocity model into long wavelength components of the received reflected signals, and short wavelength components of the received reflected signals comprises obtaining the long wavelength components of the received reflected signals by evaluating the following expression—

$$\frac{\partial \delta G}{\partial m_0}\bigg|_{\delta m}(m_0, \delta m)(r, \omega, s; x) = $$
$$\omega^2 \int dy \left( \frac{\partial G_0}{\partial m_0}(r, \omega; y) G(y, \omega; s) + G_0(r, \omega; y) \frac{\partial G}{\partial m_0}(y, \omega; s) \right) \delta m(y).$$

According to the second aspect, the step of updating the short wavelength component and the long wavelength component in an iterative relaxation process comprises, obtaining the initial long wavelength component, obtaining the initial short wavelength component using the initial long wavelength component, fixing the short wavelength component, updating the long wavelength components using a local optimization scheme and then fixing the long wavelength component, and generating the updated velocity model using the updated long wavelength component and short wavelength component in the full waveform inversion function.

Still further according to the second aspect, the step of obtaining the initial short wavelength component comprises using a true amplitude migration process, and the step of using the iterated long wavelength components of the received reflected signals and the iterated short wavelength components of the received reflected signals to generate an iterative velocity model with improved velocity resolution comprises determining a set of residual data by evaluating the following expression—

$$R(r,\omega;s) = G_{obs}(r,\omega;s) - G_{cal}(r,\omega;s);$$

solving for a gradient of the cost by evaluating the following expression using the determined residual data—

$$\frac{\partial C}{\partial m_0}\bigg|_{\delta m}(x) = -\int\int dsdr \int d\omega \frac{\partial \delta G}{\partial m_0(x)}\bigg|_{\delta m}^{*}(r,\omega,s;x)R,$$

and evaluating the following expression to update the velocity model by using the results of the gradient cost function—

$$\frac{\partial \delta G}{\partial m_0}\bigg|_{\delta m}(m_0, \delta m)(r,\omega,s;x) =$$
$$\omega^2 \int dy \left(\frac{\partial G_0}{\partial m_0}(r,\omega;y)G(y,\omega;s) + G_0(r,\omega;y)\frac{\partial G}{\partial m_0}(y,\omega;s)\right)\delta m(y).$$

According to third aspect of the embodiment, a system for generating a velocity model of returned seismic signals for under-ocean floor environments is provided comprising a plurality of sources configured to generate a series of source signals, a plurality of receivers configured to receive a corresponding set of direct signals, reflected signals, and refracted signals, a processor configured to solve a velocity model equation using a full waveform inversion function with respect to the received set of direct signals, reflected signals and refracted signals to minimize a least square misfit function by relaxing a dependency on low frequency reflections in the full waveform inversion function, and wherein the processor is further configured to generate the velocity model based on the solution to the velocity model equation, and a display configured to display the velocity model.

According to the third aspect, the processor is further configured to update long wavelength components of the full waveform inversion function generated velocity model affecting the received reflected signals when relaxing the dependency on low frequency reflections. According to the third aspect, the processor is further configured to implement a non-linear iterative relaxation process, such that the processor is still further configured to obtain the long wavelength components of the received reflected signals, update the short wavelength components using the long wavelength components, fix the short wavelength components, update the long wavelength components using the fixed short wavelength components, and generate the updated velocity model using the updated short wavelength component and updated long wavelength components.

According to the third aspect, the processor is further configured to use a true amplitude migration process to update the short wavelength components using the long wavelength components, and still further the processor is further configured to use the true amplitude migration process by evaluating the following expression—

$$\frac{\partial \delta G}{\partial m_0}\bigg|_{\delta m}(m_0, \delta m)(r,\omega,s;x) =$$
$$\omega^2 \int dy \left(\frac{\partial G_0}{\partial m_0}(r,\omega;y)G(y,\omega;s) + G_0(r,\omega;y)\frac{\partial G}{\partial m_0}(y,\omega;s)\right)\delta m(y).$$

According to the third aspect, the processor is further configured to use a local optimization scheme to update the long wavelength components when using the fixed short wavelength components, and wherein the processor is further configured to use the local optimization scheme by evaluating the following expressions—

$$R(r,\omega;s) = G_{obs}(r,\omega;s) - G_{cal}(r,\omega;s),$$

and $$\frac{\partial C}{\partial m_0}\bigg|_{\delta m}(x) = -\int\int dsdr \int d\omega \frac{\partial \delta G}{\partial m_0(x)}\bigg|_{\delta m}^{*}(r,\omega,s;x)R(r,\omega;s).$$

According to a fourth aspect of the embodiment, a system for generating a velocity model of returned seismic signals for under-ocean floor environments is provided comprising a plurality of sources configured to generate a series of source signals, a plurality of receivers configured to receive a corresponding set of direct signals, reflected signals, and refracted signals, a processor configured to solve a velocity model equation using a full waveform inversion function with respect to the received set of direct signals, reflected signals and refracted signals to minimize a least square misfit function, split the full waveform inversion velocity model into long wavelength components of the received reflected signals, and short wavelength components of the received reflected signals, update the short wavelength components of the received reflected signals, and long wavelength components of the received reflected signals using an iterative relaxation process, and generate an iterative velocity model based on the solution to the velocity model equation that includes the iterated long wavelength components of the received reflected signals and the iterated short wavelength components of the received reflected signals, and a display configured to display the velocity model.

According to the fourth aspect, the processor is further configured to obtain the long wavelength components of the received reflected signals when splitting the full waveform inversion velocity model into long wavelength components of the received reflected signals, and short wavelength components of the received reflected signals, by evaluating the following expression—

$$\frac{\partial \delta G}{\partial m_0}\bigg|_{\delta m}(m_0, \delta m)(r,\omega,s;x) =$$
$$\omega^2 \int dy \left(\frac{\partial G_0}{\partial m_0}(r,\omega;y)G(y,\omega;s) + G_0(r,\omega;y)\frac{\partial G}{\partial m_0}(y,\omega;s)\right)\delta m(y).$$

According to the fourth aspect, the processor is further configured to obtain the initial long wavelength component, obtain the initial short wavelength component using the initial long wavelength component, fix the short wavelength component, update the long wavelength components using a local optimization scheme and then fixing the long wavelength component, and generate the updated velocity model using the updated long wavelength component and short wavelength component in the full waveform inversion function.

Still further according to the fourth aspect, the processor is further configured to use a true amplitude migration process when obtaining the initial short wavelength component, and the processor is still further configured to determine a set of residual data by evaluating the following expression—

$$R(r,\omega;s) = G_{obs}(r,\omega;s) - G_{cal}(r,\omega;s),$$

and wherein the processor is still further configured to obtain a gradient of the cost function by using the determined residual data and evaluating the following expression—

$$\frac{\partial C}{\partial m_0}\bigg|_{\delta m}(x) = -\int\int dsdr \int d\omega \frac{\partial \delta G}{\partial m_0(x)}\bigg|_{\delta m}^{*}(r,\omega,s;x)R(r,\omega;s),$$

and
wherein the processor is still further configured to update the velocity model by using the results of the gradient cost function and evaluating the following expression—

$$\frac{\partial \delta G}{\partial m_0}\bigg|_{\delta m}(m_0,\delta m)(r,\omega,s;x) =$$
$$\omega^2 \int dy \bigg(\frac{\partial G_0}{\partial m_0}(r,\omega;y)G(y,\omega;s) + G_0(r,\omega;y)\frac{\partial G}{\partial m_0}(y,\omega;s)\bigg)\delta m(y).$$

BRIEF DESCRIPTION OF THE DRAWINGS

The above and other objects and features of the present general inventive concept will become apparent and more readily appreciated from the following description of the embodiments with reference to the following figures, wherein like reference numerals refer to like parts throughout the various figures unless otherwise specified, and wherein:

FIG. 7 illustrates a top level flow chart of a method for obtaining and improving velocity model resolution of underwater geographical environments using seismic exploration techniques according to an embodiment;

FIGS. 10A-C illustrate an application of the method described in reference FIGS. 7-9 for a Gulf of Mexico location, according to an embodiment.

DETAILED DESCRIPTION

Figure 1:
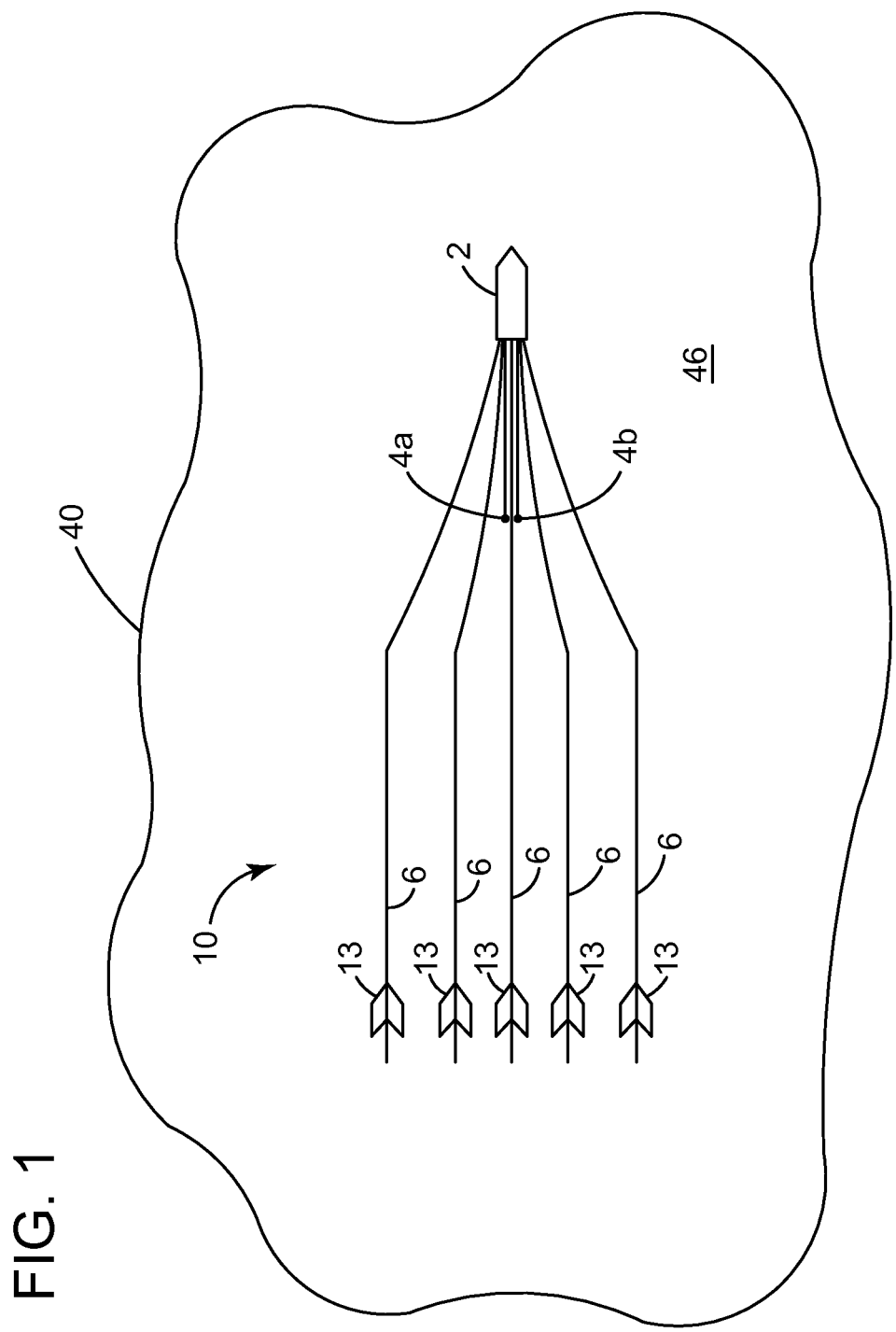
FIG. 1 illustrates a top view of a data acquisition system for use in an underwater seismic gathering process.
Figure 2:
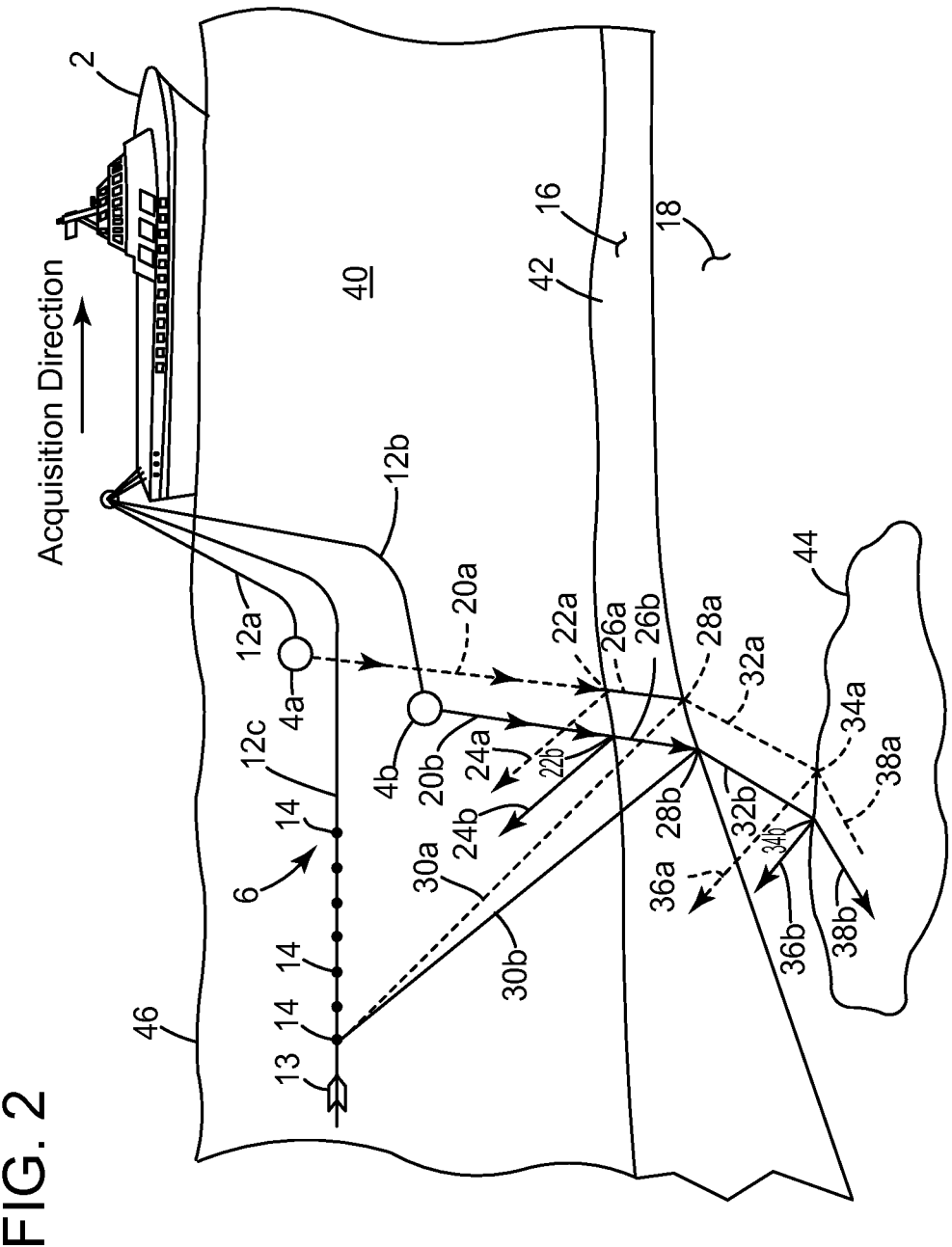
FIG. 2 illustrates a side view of the data acquisition system of FIG. 1.
Figure 3:
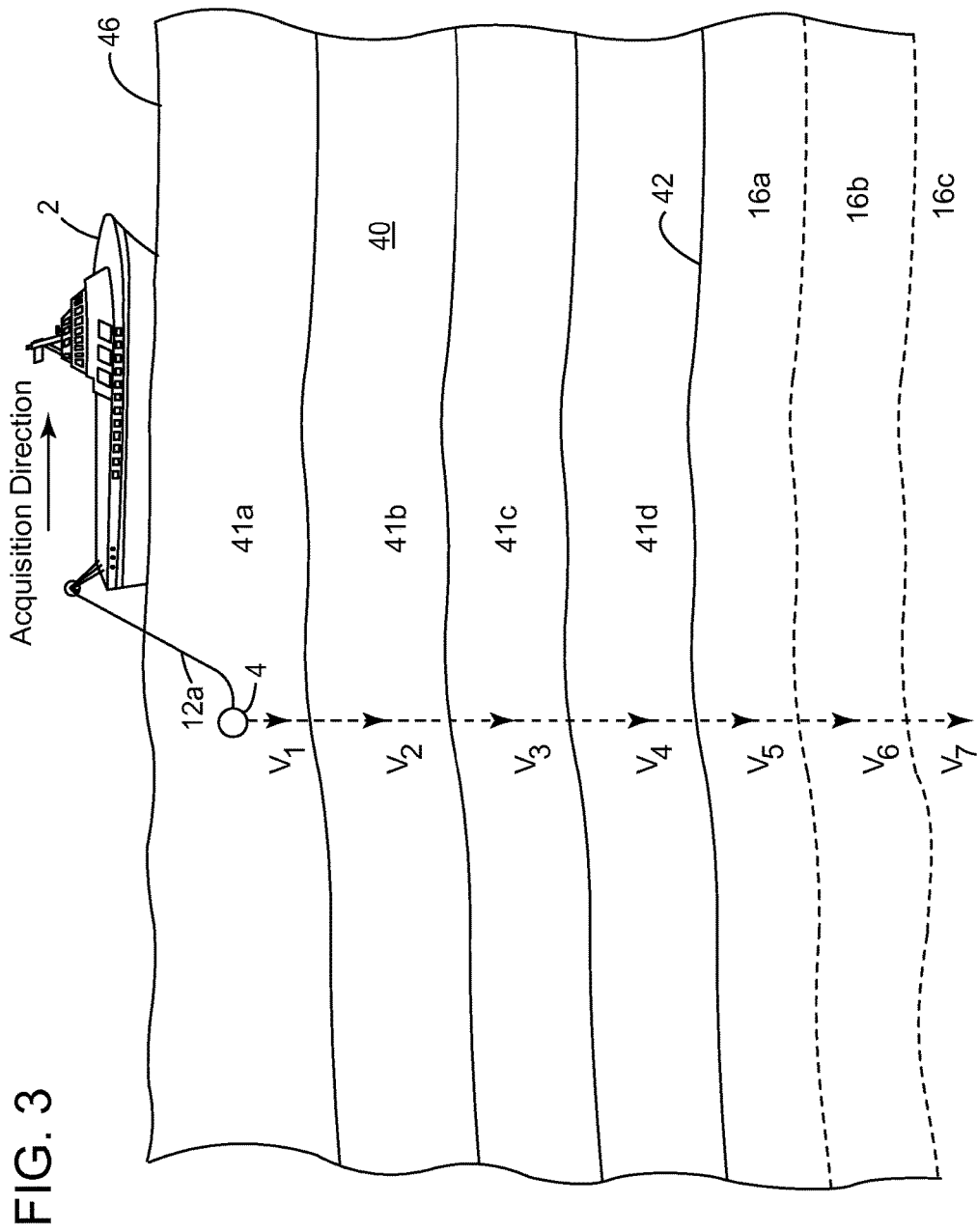
FIG. 3 illustrates a series of velocity layers in both an underwater environment, and an underground (underwater) environment.
Figure 4:
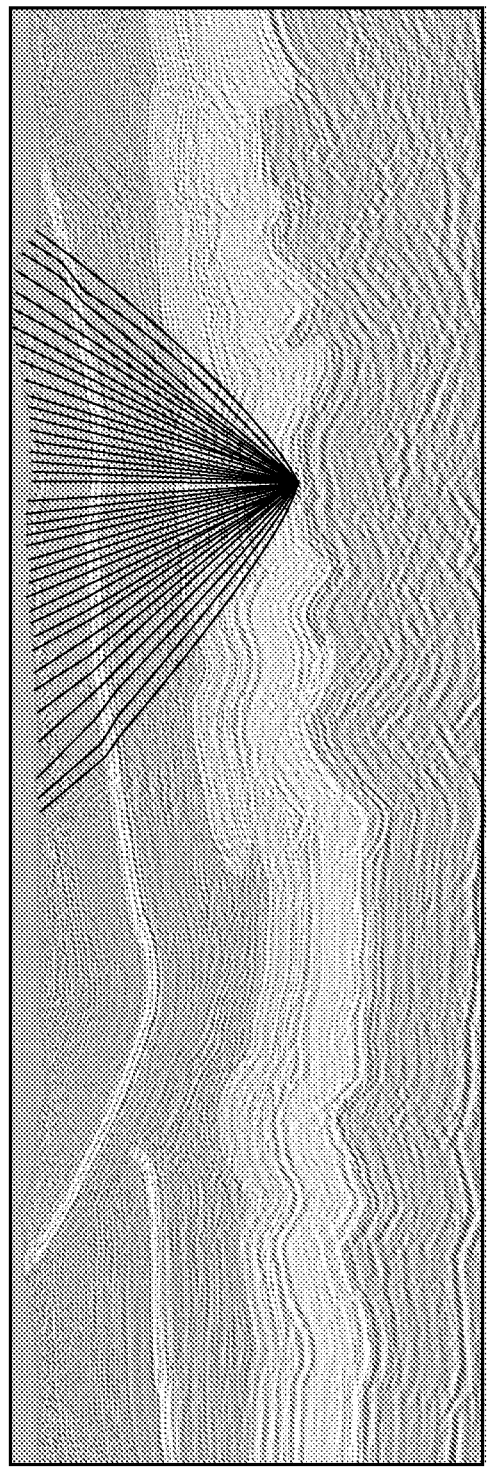
FIG. 4 illustrates a velocity model diagram of a known geographical location showing several strata of velocity layers under the earth's surface.

The concept is described more fully hereinafter with reference to the accompanying drawings, in which at least one or more embodiments are shown. In the drawings, the size and relative sizes of layers and regions may be exaggerated for clarity. Like numbers refer to like elements throughout. The embodiments may, however, be shown in many different forms and should not be construed as limited to those set forth herein. Rather, these embodiments are provided so that this disclosure will be thorough and complete, and will fully convey the scope of the embodiments to those skilled in the art. The scope of the embodiments is therefore defined by the appended claims. The following embodiments are discussed, for simplicity, with regard to the terminology and structure of an underwater seismic exploration system, using the devices and techniques generally known to those of ordinary skill in the art. However, the embodiments to be discussed next are not limited to these systems but may be applied to other underground seismic exploration systems that are affected by inaccuracies in determining velocity models.

Reference throughout the specification to "one embodiment" or "an embodiment" means that a particular feature, structure, or characteristic described in connection with an embodiment is included in at least one embodiment. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

Used throughout the specification are several acronyms, the meaning of which are provided as follows: full waveform inversion (FWI); two dimensional (2D); seismic reflection full waveform inversion (SRFWI); migration-based travel time (MBTT); differential semblance optimization (DSO); meters-per-second (mps); universal serial bus (USB); geographical area of interest (GAI); short wavelength component (SWC); long wavelength component (LWC); seismic reflection full wave inversion (SRFWI); and migration-based travel time (MBTT).

In recent developments, full waveform inversion has been used successfully in building high resolution velocity models for shallow layers. To achieve this, however, refracted waves or low frequencies are required in the reflection/refraction data. It would be advantageous to loosen, or to relax, the dependence on low frequency reflections (i.e., long wavelength components) when using full waveform inversion. According to an embodiment, such dependencies can be relaxed or loosened by providing for the updating of long wavelength components of the velocity model affecting the reflected arrivals. According to such an embodiment, a non-linear iterative relaxation approach is used wherein short and long wavelength components of the velocity model are updated alternatively. According to a further embodiment, the associated Fréchet derivatives and gradients improves the resolution provided by full waveform inversion.

As those of ordinary skill in the art can appreciate, determination of velocity models begins with the scalar acoustic wave equation. In the frequency domain the associated Green's function $G(x,\omega;s)$ (where x is the position, $\omega$ is the angular time frequency, and s is the shot position) satisfies the equation, $$-\omega^2 mG - \Delta G = \delta(x-s) \qquad (1),$$

where $m(x)=1/v^2(x)$ is the model to be estimated, i.e. the squared slowness. In a classical full waveform inversion, $m(x)$ is solved to minimize the square misfit cost function as:

$$C(m) = \frac{1}{2}\int\int\int dsdrd\omega \|G_{obs}(r,\omega;s) - G_{cal}(m)(r,\omega;s)\|^2 \qquad (2)$$

where $G_{obs}$ and $G_{cal}$ denote the observed and calculated Green function, respectively, and s and r are the set of source and receiver positions, respectively.

As discussed above, and according to an embodiment, the model is split into two components as follows:

$$m = m_0 + \delta m, \qquad (3)$$

where $m_0$ contains the long wavelength components of the velocity model (explaining the transmission behavior of the model), and $\delta m$ contains the short wavelength components (explaining the reflection behavior of the model). Accordingly, the Green functions can be split into:

$$G(m_0 + \delta m) = G_0(m_0) + \delta G(m_0, \delta m). \qquad (4)$$

An exact expression of the perturbation of the Green function depending on $m_0$ and $\delta m$ is given by the Fredholm integral equation from the second kind:

$$\delta G(m_0, \delta m)(r,\omega;s) = \omega^2 \int dx G_0(r,\omega;x) G(x,\omega;s) \delta m(x). \qquad (5)$$

Then, as discussed above, and according to an embodiment, the use of Fréchet derivatives of $\delta G$ for $\delta m$ and $m_0$ can now be implemented.

The expression of the Fréchet derivative of $\delta G$ with respect to $\delta m$, with a fixed $m_0$, is the conventional kernel of the Born operator—

$$\left.\frac{\partial \delta G}{\partial \delta m}\right|_{m_0}(m_0)(r,\omega,s;x) = \omega^2 G_0(r,\omega;x) G_0(x,\omega;s). \qquad (6)$$

As can be seen, the Born operator depends on $m_0$ but not on $\delta m$, and corresponds to the Fréchet derivative of the conventional full waveform inversion problem. As such, it is also the kernel of a "normal" migration operator (see, Lailly, P., 1983, "The Seismic Inverse Problem as a Sequence of Before Stack Migrations: Proceedings of the International Conference on 'Inverse Scattering, Theory and Applications', Tulsa, Okla.," SIAM Publisher; and also Tarantola, A., 1984, "Inversion of Seismic Reflection Data in the Acoustic Approximation," Geophysics, 49, 1259-1266, the entire contents of both of which are incorporated herein by reference).

The gradient of the cost function (see, Equation (2)) can be computed from the Fréchet derivative as:

$$\left.\frac{\partial C}{\partial \delta m}\right|_{m_0}(x) = -\int\int dsdr \int d\omega \left.\frac{\partial \delta G}{\partial \delta m}\right|_{m_0}^{*}(r,\omega,s;x) R(r,\omega;s), \qquad (7)$$

where * denotes the conjugated form of the function, and R are the residuals defined by $$R(r,\omega;s) = G_{obs}(r\omega;s) - G_{cal}(r;\omega;s). \qquad (8)$$

Figure 5:
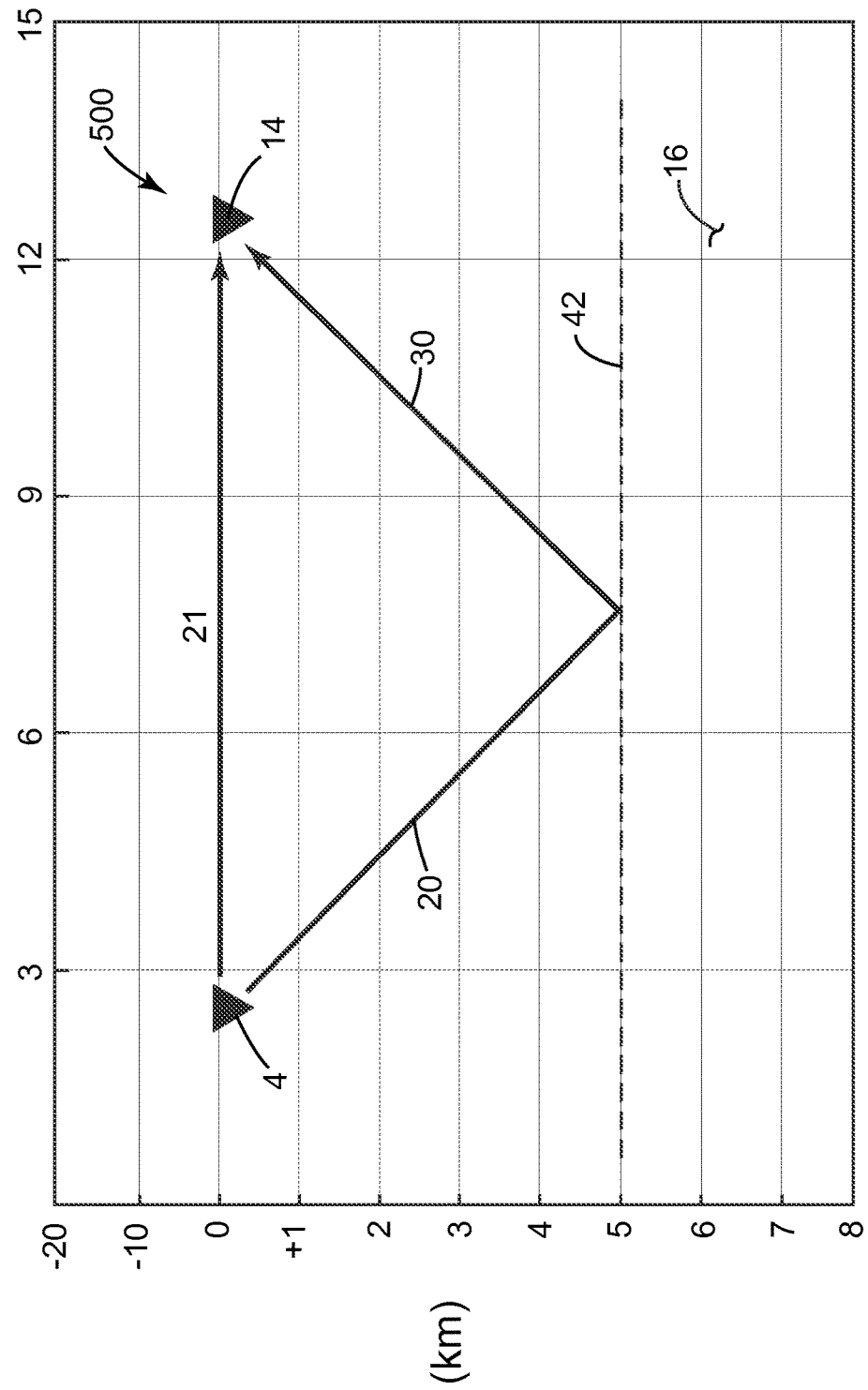
FIG. 5 illustrates a test system used to generate direct, diving and refracted waves to illustrate contributions by low and high frequency components to gradients of classical full waveform inversion and to gradients of seismic reflection full waveform inversion according to an embodiment.

FIG. 5 illustrates test system 500 used to generate direct waves 21, diving waves 20 and reflected waves 30 to illustrate contributions by low and high frequency components to gradients of classical full waveform inversion and to gradients of seismic reflection full waveform inversion according to an embodiment. In FIG. 5, source 4 is a Ricker type wave source, with a peak frequency of about 6 Hz, and with a background velocity of 2.0 km/s. Source 4 is located at (3, 0) km, and the receiver is located at (12.5, 0) km. Source 4 is about 5.0 km above ocean floor 42.

Figure 6B:
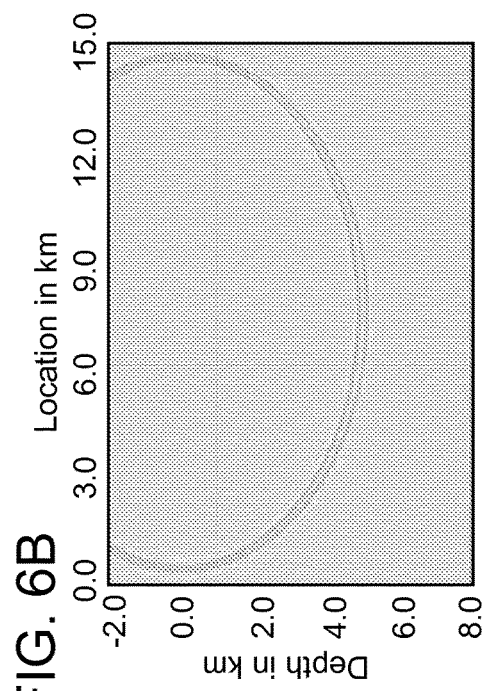
FIGS. 6A and 6B illustrate contributions by different wave components when performing underwater seismic explorations in gradients obtained through the use of a conventional full waveform inversion method.
Figure 6D:
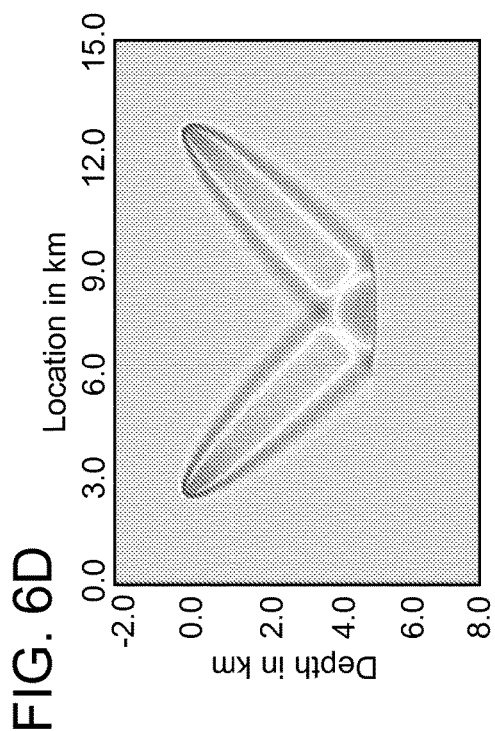
FIGS. 6C and 6D illustrate contributions by different wave components when performing underwater seismic explorations in gradients obtained through the use of a seismic reflection full waveform inversion method according to an embodiment.
Figure 6A:
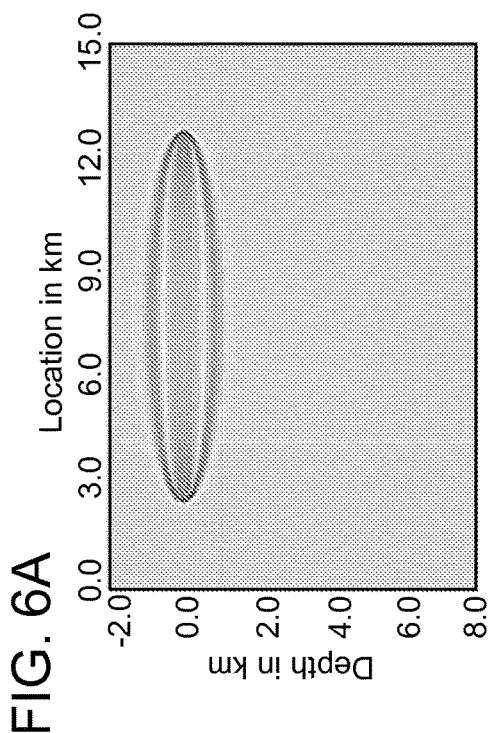

The contribution to the gradient of direct wave 21, diving wave 20, and the refracted wave (not shown in FIG. 5), are shown in FIG. 6A. The contribution of the reflected wave 30 is the "normal" migration response of their residuals as shown in FIG. 6B. It has been demonstrated that if FWI can recover the long wavelength components of the velocity model in the shallow area (in fact along the diving wave paths) it cannot recover the long wavelength components in the deeper area if sufficiently low frequencies are not available in the data (see, Plessix, R.-E. et al., 2010, "VTI Full Waveform Inversion: A Parameterization Study With a Narrow Azimuth Streamer Data Example," SEG, Expanded Abstracts, p. 962-966, the entire contents of which are incorporated herein by reference).

Returning to the derivation of the math expressions for the methods described in FIGS. 5 and 6, attention is directed to obtaining the Fréchet derivative of $\delta G$ (i.e., Equation (5)) with respect to $m_0$ but at the same time fixing $\delta m$. Equation (5) can then be re-written as—

$$\left.\frac{\partial \delta G}{\partial m_0}\right|_{\delta m}(m_0, \delta m)(r,\omega,s;x) = \qquad (9)$$
$$\omega^2 \int dy \left(\frac{\partial G_0}{\partial m_0}(r,\omega;y) G(y,\omega;s) + G_0(r,\omega;y)\frac{\partial G}{\partial m_0}(y,\omega;s)\right)\delta m(y)$$

where Born expressions for $\partial G_0/\partial m_0$, and $\partial G/\partial m_0$ can be introduced as follows:

$$\frac{\partial G_0}{\partial m_0(x)}(r,\omega,y) = \omega^2 G_0(r,\omega;x) G_0(x,\omega;y) \text{ and} \qquad (10a)$$

$$\frac{\partial G}{\partial m_0(x)}(y,\omega,s) = \omega^2 G(y,\omega;x) G(x,\omega;s). \qquad (10b)$$

From Equations (10a) and (10b) are obtained the following:

$$\frac{\partial \delta G}{\partial m_0}(r,\omega,s;x) = \qquad (11)$$
$$\omega^4 \int dy (G_0(r,\omega;x) G_0(x,\omega;y) G(y,\omega;s) + G_0(r,\omega;y)$$
$$G(y,\omega;x) G(x,\omega;s))\delta m(y).$$

The previous equations are then used with Equation (5) to obtain the following:

$$\left.\frac{\partial \delta G}{\partial m_0(x)}\right|_{\delta m}(m_0, \delta m)(r, \omega, s; x) = \qquad (12)$$
$$\omega^2(G_0(r, \omega; x)\delta G(x, \omega; s) + \delta G(r, \omega; x)G_0(x, \omega; s))$$

Equation (12) depends both on $m_0$ and $\delta m$ (through term $\partial G$).

Figure 6C:
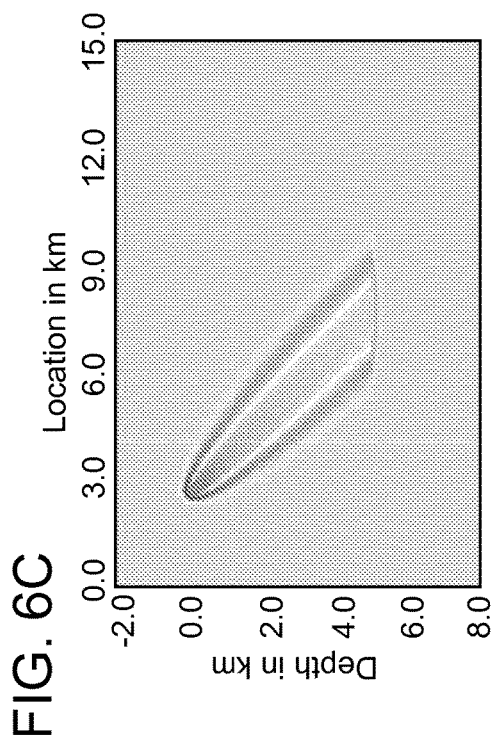

The gradient of the cost function with respect to $m_0$ while fixing $\delta m$ is $$\left.\frac{\partial C}{\partial m_0}\right|_{\delta m}(x) = -\int\int ds dr \int d\omega \left.\frac{\partial \delta G}{\partial m_0(x)}\right|_{\delta m}^*(r, \omega, s; x)R(r, \omega; s), \qquad (13)$$

and as shown in FIGS. 6C and 6D, the contribution to the gradient of the reflected waves is built up along the wave propagation paths of the reflections. FIG. 6C shows the contribution corresponding to the wave path from the source to the reflector (i.e., source wave 20, and is represented by the first term on the right hand side of Equation (12)) while FIG. 6D shows the total contribution, i.e., the wave from source 4 to the reflector (ocean floor 42, i.e., source wave 20) and then to receiver 14 (i.e., reflected wave 30).

The data shown in FIGS. 6A-D can be further explained as follows. FIGS. 6A and 6B are results obtained using conventional FWI. FIG. 6A represents the contribution of direct wave 21 to the gradient of FWI, and FIG. 6B represents the contribution of the reflected waves, waves 20 and 30, to the gradient of FWI. FIG. 6C, however, is representative of the source-reflector wave (i.e., wave 20) contribution to the new gradient as expressed in Equation (13) of seismic reflection full wave inversion (SRFWI) according to an embodiment. FIG. 6D is representative of the total source-reflector-receiver wave contribution (i.e., waves 20 and 30) to our new gradient as expressed in Equation (13) of SRFWI according to an embodiment.

Following the determination of Equation (13), the next step is to prepare a local optimization of the cost function C for $m_0$, while fixing $\delta m$ at each non-linear iteration, which will be suitable for recovering the long wavelength components in depth of the velocity model available in the reflected arrivals.

Figure 8:
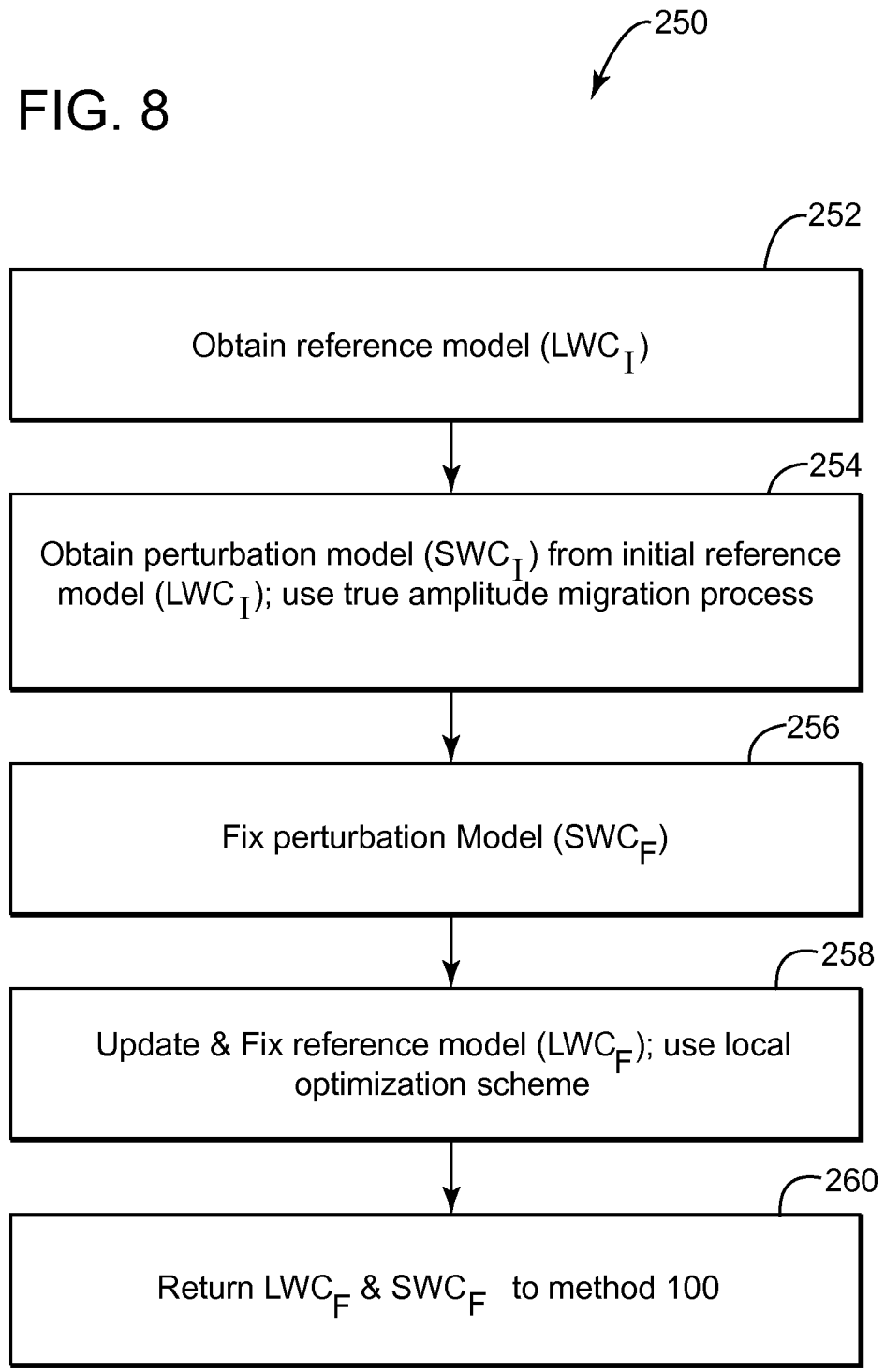
FIG. 8 illustrates a flow chart showing greater details of one of the steps illustrated in FIG. 7 according to an embodiment.
Figure 9:
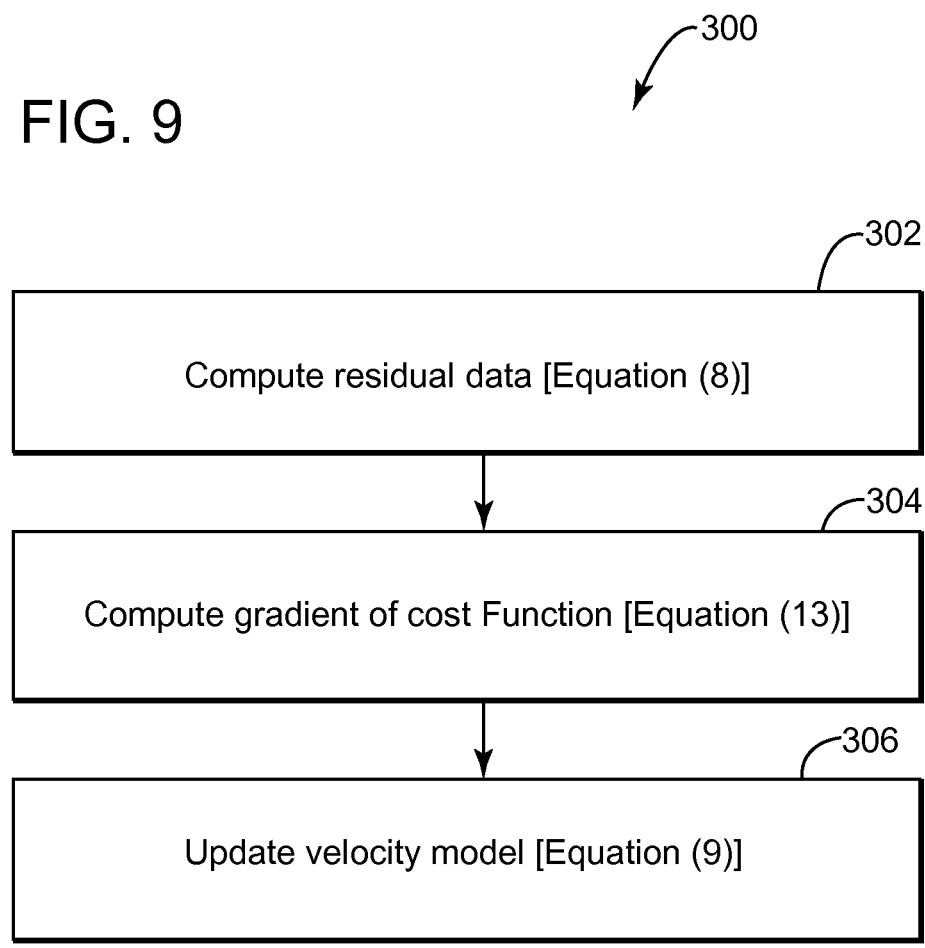
FIG. 9 illustrates a flow chart showing greater details of one of the steps illustrated in FIG. 7 according to an embodiment.

Having discussed in detail the mathematical steps needed to process the data to obtain a higher resolution velocity model for returned seismic waves in underwater surveys, attention is now directed to FIGS. 7-9 wherein methods 100, 200, and 300 for the determination of improved velocity resolution using SRFWI according to an embodiment are now described in greater detail. FIG. 7 describes the overall process, and FIGS. 8 and 9 describe in greater detail several of the steps of method 100 according to an embodiment.

FIG. 7 illustrates a top level flow chart of method 100 for obtaining and improving velocity model resolution according to an embodiment. $m_0$ represents the long wave component (LWC) of the returned velocity data or information, or reference model, and is iteratively updated through a non-linear local optimization scheme, discussed below in regard to step 258, and FIG. 8. Method 100 begins with step 102 in which a least square misfit function of FWI is obtained. $m_0$ is determined according to Equation (9). The $\delta G$ term or short wave component (SWC), is approximated by a wave equation modeling using the model and the reflectivity derived from the true amplitude migration of the previous iteration residuals (see, steps 108, 110) (see, Zhang, Y., et al., 2007, "True-amplitude, Angle-domain, Common-image Gathers From One-way Wave-equation Migrations," Geophysics, 72, 1, S49-S58, the entire contents of which are incorporated herein by reference). Then, in step 104, the velocity model is split into the long wavelength component (LWC, or $m_0$), and the short wavelength component (SWC). The LWC ($m_0$) can also be referred to as a reference model, and the SWC ($\delta G$) as the perturbation model. Following step 104, the LWC and SWC are updated jointly in step 106, with an iterative relaxation method, described in greater detail in regard to FIG. 8, and method 250. Following step 106, the final LWC and SWC elements are returned and entered back into a FWI calculation, as shown in step 108, discussed in greater detail in regard to FIG. 9 and method 300, and an improved velocity model with greater velocity resolution is obtained. Step 110 of method 100 calls for the iteration of steps 104-108 in order to obtain a more accurate and higher resolution velocity model of the underground/underwater seismic waves according to an embodiment.

Turning now to FIG. 8, step 106 of method 100 is described in greater detail as method 250 according to an embodiment. In method 250, the initial reference model, $LWC_{Initial}$ (or $m_0^{init}$) is obtained in step 252. Then, in step 254, the initial perturbation model, $SWC_{Initial}$ (or $\delta G^{init}$, the simulated perturbation wavefield) is obtained from the initial reference model, i.e., the true amplitude migration result and the initial velocity model ($m_0^{init}$). Following step 254, method 250 proceeds to step 256 wherein the perturbation model is fixed, or finalized (for each loop) to obtain $SWC_{Final}$, and in step 258, the reference model is updated and then fixed (or finalized) using a local optimization scheme to obtain $LWC_{Final}$ (or $m_0^{updated}$). In step 260 both the reference and perturbation models are returned to method 100 (in step 108) such that the velocity models with increased resolution can be obtained.

Turning now to FIG. 9, and method 300, step 108 is explained in greater detail. In step 302, method 300 calculates the residual data according to Equation (8) as discussed in greater detail above. Then, using the results obtained in step 302, method 300 computes the gradient of the cost function according to Equation (13). Following step 304, method 300 performs step 306 wherein velocity model m0 updated is determined according to Equation (9). Then, in method 100, those results are displayed, and according to step 110, steps 104-108 are repeated to provide enhanced resolution in the velocity model of the returned seismic waves according to an embodiment. In order to focus on the reflected wavefield the direct and refracted waves are muted in $\delta G$. According to an embodiment, implementation of Fréchet derivatives and gradients greatly improves the velocity resolution that is normally produced by a conventional FWI process.

Results from an implementation of methods 100, 250, and 300 described herein according to an embodiment is similar to the migration-based travel time (MBTT) waveform inversion approach proposed by Chavent, G. et al., 1994, "Automatic Determination of Velocities Via Migration-Based Travel Time Waveform Inversion: A Synthetic Data Example," SEG Expanded Abstracts 13, p. 1179-1182, the entire contents of which are incorporated herein by reference, which also has some similarity in terms of resolution with the differential semblance optimization (DSO) method proposed by Symes, W. W., and J. J. Carazzone, 1991, "Velocity Inversion by Differential Semblance Optimization," Geophysics 56, 654-663, the entire contents of which are incorporated herein by reference.

FIGS. 10A-C illustrate data from a two dimensional application of the method described in reference FIGS. 7-9 for a Gulf of Mexico location, according to an embodiment. The data was obtained from a three dimensional data set and corresponds to a velocity anomaly that corresponds to a gas cloud. In order to ensure an efficient manipulation of the data, the shot numbers were reduced to one third of the normal amount, and the inversion was performed with traces low pass filtered at about 8 Hz. FIG. 10A is initial velocity data, and FIG. 10B displays inverted velocity data. FIG. 10C displays velocity perturbation that corresponds to the inverted velocity from the method according to an embodiment. Although the acquired maximum offset is about 8 km and the water bottom is about 3 km deep, long wavelength component data as determined by the methods can be clearly see in the target area. Still further according to an embodiment, the migrated image is also improved with the updated velocity.

Figure 11:
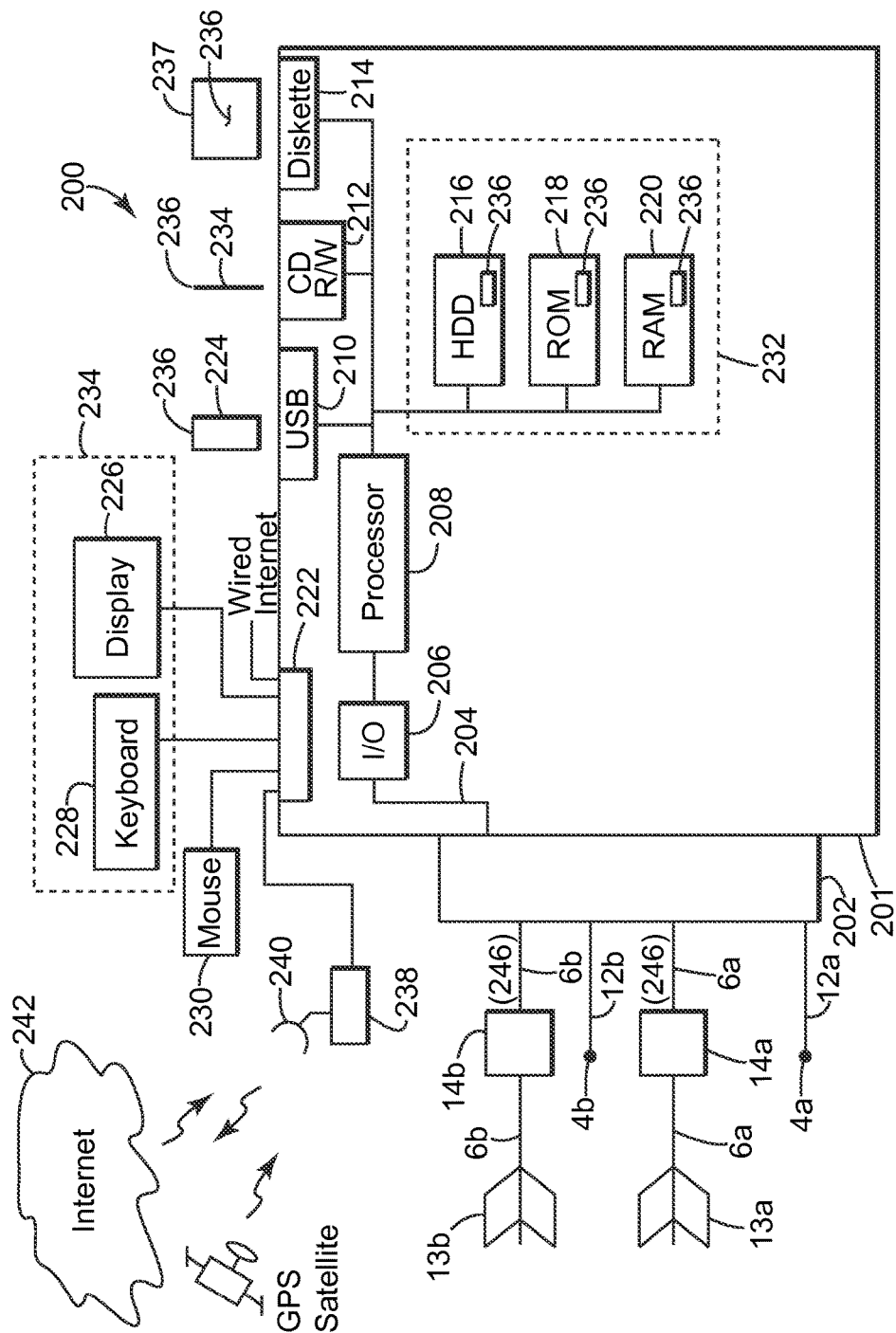
FIG. 11 illustrates a seismic data acquisition system suitable for use to implement a method for obtaining and improving velocity model resolution of underwater geographical environments using seismic exploration techniques according to an embodiment.

FIG. 11 illustrates a seismic data acquisition system (system) 200 suitable for use to implement a method for providing higher resolution models of seismic underwater and underground velocity data according to an embodiment. System 200 includes, among other items, server 201, source/receiver interface 202, internal data/communications bus (bus) 204, processor(s) 208 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors)), universal serial bus (USB) port 210, compact disk (CD)/digital video disk (DVD) read/write (R/W) drive (also referred to as a "CD ROM drive") 212, floppy diskette drive (diskette drive) 214 (though less used currently, many servers still include this device), and data storage unit 232. Data storage unit 232 itself can comprise hard disk drive (HDD) 216 (these can include conventional magnetic storage media, but, as is becoming increasingly more prevalent, can include flash drive-type mass storage devices 224, among other types), ROM device(s) 218 (these can include electrically erasable (EE) programmable ROM (EEPROM) devices, ultra-violet erasable PROM devices (UVPROMs), among other types), and random access memory (RAM) devices 220. Usable with USB port 210 is flash drive device 224, and usable with CD/DVD R/W device 212 are CD/DVD disks 234. Usable with diskette drive device 214 are floppy diskettes 237. Each of the memory storage devices, or the memory storage media (216, 218, 220, 224, 234, and 237, among other types), can contain parts or components, or in its entirety, executable software programming code (software) 236 that can implement the method described herein. Further, processor 208 itself can contain one or different types of memory storage devices (most probably, but not in a limiting manner, RAM memory storage media 220) that can store all or some of the components of software 236.

In addition to the above described components, system 200 also comprises user console 234, which can include keyboard 228, display 226, and mouse 230. All of these components are known to those of ordinary skill in the art, and this description includes all known and future variants of these types of devices. Display 226 can be any type of known display or presentation screen, such as liquid crystal displays (LCDs), plasma displays, cathode ray tubes (CRTs), among others. User console 234 can include one or more user interface mechanisms such as a mouse, keyboard, microphone, touch pad, touch screen, voice-recognition system, among other inter-active inter-communicative devices.

User console 234, and its components if separately provided, interface with server 201 via server input/output (I/O) interface 222, which can be an RS232, Ethernet, USB or other type of communications port, or can include all or some of these, and further includes any other type of communications means, presently known or further developed. System 200 can further include communications satellite/global positioning system (GPS) transceiver device 238, to which is electrically connected at least one antenna 240 (according to an embodiment, there would be at least one GPS receive-only antenna, and at least one separate satellite bi-directional communications antenna). System 200 can access internet 242, either through a hard wired connection, via I/O interface 222 directly, or wirelessly via antenna 240, and transceiver 238.

Server 201 can be coupled to other computing devices, such as those that operate or control the equipment of ship 2, via one or more networks. Server 201 may be part of a larger network configuration as in a global area network (GAN) (e.g., internet 242), which ultimately allows connection to various landlines.

According to a further embodiment, system 200, being ostensibly designed for use in seismic exploration, will interface with one or more sources 4 and one or more receivers 14. These, as previously described, are attached to streamers 6, to which are also attached birds 13a,b that are useful to maintain positioning. As further previously discussed, sources 4 and receivers 14 can communicate with server 201 either through an electrical cable that is part of streamer 6, or via a wireless system that can communicate via antenna 240 and transceiver 238 (collectively described as communications conduit 246).

According to further embodiments, user console 234 (for example: a keyboard, buttons, switches, touch screen and/or joy stick) provides a means for personnel to enter commands and configuration into system 200. Display device 226 can be used to show: streamer 6 position, visual representations of acquired data, source 4 and receiver 14 status information, survey information and other information important to the seismic data acquisition process. Source and receiver interface unit 202 can receive the hydrophone seismic data, from receiver 14, though streamer communication conduit 248 (discussed above) that can be part of streamer 6, as well as streamer 6 position information from birds 13; the link is bi-directional so that commands can also be sent to birds 13 to maintain proper streamer positioning. Source and receiver interface unit 202 can also communicate bi-directionally with sources 4 through the streamer communication conduit 248 that can be part of streamer 6. Excitation signals, control signals, output signals and status information related to source 4 can be exchanged by streamer communication conduit 246 between system 200 and source 4.

Bus 204 allows a data pathway for things like: the transfer and storage of data that originate from either the source sensors or streamer receivers; for processor 208 to access stored data contained in data storage unit memory 232; for processor 208 to send information for visual display to the display 226; or for the user to send commands to system operating programs that might reside in either the processor 208 or the source and receiver interface unit 202.

System 200 can be used to implement methods 100, 250, and 300 to provide a higher resolution velocity model for underground and underwater seismic exploration according to an embodiment. Hardware, firmware, software or a combination thereof may be used to perform the various steps and operations described herein. According to an embodiment, software 236 for carrying out the above discussed steps can be stored and distributed on multi-media storage devices such as devices 216, 218, 220, 224, 234, and/or 237 (described above) or other form of media capable of portably storing information (e.g., universal serial bus (USB) flash drive 224). These storage media may be inserted into, and read by, devices such as the CD-ROM drive 201, the disk drive 214, etc.

According to an embodiment, implementation of methods 100, 250, and 300 can occur in a dedicated processor (not shown in FIG. 11). Those of ordinary skill in the art can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertain.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

We claim:

1. A method for exploring under-ocean floor environments, the method comprising:
   generating a series of source signals by a seismic source configured to inject the source signals into an under-ocean floor explored structure;
   recording direct signals, reflected signals, and refracted signals corresponding to the source signals;
   solving a velocity model equation using a full waveform inversion function with respect to the direct signals, reflected signals and refracted signals to minimize a least square misfit function by relaxing a dependency on low frequency reflections in the full waveform inversion function;
   generating the velocity model based on the solution to the velocity model equation; and determining location of a hydrocarbon reservoir in the under-ocean floor explored structure based on strong velocity or anisotropic parameter variations in the velocity model,
wherein the relaxing the dependency on the low frequency reflections includes
splitting an initial velocity model m into a long wavelength component $m_o$ and a short wavelength component $\delta m$, and
updating the long wavelength component $m_o$ while the short wavelength component $\delta m$ is fixed.

2. The method according to claim 1, wherein the step of relaxing the dependency on low frequency reflections comprises:
updating the long wavelength component using a local optimization scheme.

3. The method according to claim 1, wherein the step of relaxing the dependency on low frequency reflections comprises:
implementing a non-linear iterative relaxation process, that includes
obtaining the long wavelength component of the reflected signals,
updating the short wavelength component using the long wavelength component,
fixing the short wavelength component, and
updating the long wavelength component using the fixed short wavelength component
wherein the updated short wavelength component and the updated long wavelength component are then used to generate the updated velocity model.

4. The method according to claim 3, wherein the step of updating the short wavelength component using the long wavelength component comprises:
evaluating the following expression $$\frac{\partial \delta G}{\partial \delta m_0}\bigg|_{\delta m}(m_0)(r, \omega, s; x) = \omega^2 G_0(r, \omega; x)G_0(y, \omega; s)$$

where G indicates Green function that is split into a Green function $G_o$ depending on $m_o$ and a perturbation thereof $\delta G$ depending on $m_o$ and $\delta m$, r is receiver position, s is shot position, $\omega$ is angular frequency and x is a model-related position.

5. The method according to claim 4, wherein the step of updating the short wavelength component using the long wavelength component comprises:
using an migration process.

6. The method according to claim 3, wherein the step of updating the long wavelength component using the fixed short wavelength component comprises:
using a local optimization scheme.

7. The method according to claim 6, wherein the step of using the local optimization scheme comprises:
evaluating the following expressions—

$$R(r, \omega; s) = G_{obs}(r, \omega; s) - G_{cal}(r, \omega; s),$$

and $$\frac{\partial C}{\partial m_0}\bigg|_{\delta m}(x) = -\int\int dsdr \int d\omega \frac{\partial \delta G}{\partial m_0(x)}\bigg|_{\delta m}^{*}(r, \omega, s; x)R(r, \omega; s)$$

where $G_{obs}$ is an observed Green function, $G_{cal}$ is a calculated Green function, * denotes complex conjugated form of a function and C is a cost function.

8. A method for exploring under-ocean floor environments, the method comprising:
generating a series of source signals by a seismic source configured to inject the source signals into an under-ocean floor explored structure;
recording direct signals, reflected signals, and refracted signals corresponding to the source signals;
solving a velocity model equation using a full waveform inversion function with respect to the set of direct signals, reflected signals and refracted signals to minimize a least square misfit function by splitting the full waveform inversion velocity model m into long wavelength components $m_o$ of the reflected signals, and short wavelength components $\delta m$ of the reflected signals;
updating the short wavelength components of the reflected signals, and the long wavelength components of the reflected signals using an iterative relaxation process;
generating an iterative velocity model based on the solution to the velocity model equation that includes the iterated long wavelength components of the reflected signals and the iterated short wavelength components of the reflected signals; and
determining location of a hydrocarbon reservoir in the under-ocean floor explored structure based on strong velocity or anisotropic parameter variations in the velocity model,
wherein the iterative relaxation process includes updating the iterated long wavelength component $m_o$ while the short wavelength component $\delta m$ is fixed.

9. The method according to claim 8, wherein the updating of the long wavelength components of the reflected signals comprises evaluating the following expression $$\frac{\partial \delta G}{\partial m_0}\bigg|_{\delta m}(m_0, \delta m)(r, \omega, s; x) =$$
$$\omega^2 \int dy \left(\frac{\partial G_0}{\partial m_0}(r, \omega; y)G(y, \omega; s) + G_0(r, \omega; y)\frac{\partial G}{\partial m_0}(y, \omega; s)\right)\delta m(y)$$

where G indicates Green function, r is receiver position, s is shot position, $\omega$ is angular frequency and x is a model-related position.

10. The method according to claim 8, wherein the step of updating the short wavelength component and the long wavelength component in an iterative relaxation process comprises:
obtaining the initial long wavelength component;
obtaining the initial short wavelength component using the initial long wavelength component;
fixing the short wavelength component;
updating the long wavelength component using a local optimization scheme and then fixing the long wavelength component; and
generating the updated velocity model using the updated long wavelength component and short wavelength component in the full waveform inversion function.

11. The method according to claim 10, wherein the step of obtaining the initial short wavelength component comprises:
using a true amplitude migration process.

12. The method according to claim 8, wherein the step of using the iterated long wavelength component of the reflected signals and the iterated short wavelength component of the reflected signals to generate an iterative velocity model with improved velocity resolution comprises:

determining a set of residual data by evaluating the following expression—

$$R(r,\omega;s) = G_{obs}(r,\omega;s) - G_{cal}(r,\omega;s);$$

solving for a gradient of the cost by evaluating the following expression using the determined residual data—

$$\left.\frac{\partial C}{\partial m_0}\right|_{\delta m}(x) = -\int\int dsdr \int d\omega \left.\frac{\partial \delta G}{\partial m_0(x)}\right|_{\delta m}^*(r,\omega,s;x) R(r,\omega;s);$$

and evaluating the following expression to update the velocity model by using the results of the gradient cost function—

$$\left.\frac{\partial \delta G}{\partial m_0}\right|_{\delta m}(m_0, \delta m)(r,\omega,s;x) =$$

$$\omega^2 \int dy \left(\frac{\partial G_0}{\partial m_0}(r,\omega;y) G(y,\omega;s) + G_0(r,\omega;y)\frac{\partial G}{\partial m_0}(y,\omega;s)\right)\delta m(y).$$

13. A system for exploring under-ocean floor environments, the system comprising:

a plurality of sources configured to generate a series of source signals and to inject the source signals into an under-ocean floor explored structure;

a plurality of receivers configured to detect and record direct signals, reflected signals, and refracted signals corresponding to the source signals;

a processor configured to solve a velocity model equation using a full waveform inversion function with respect to the direct signals, reflected signals and refracted signals to minimize a least square misfit function by relaxing a dependency on low frequency reflections in the full waveform inversion function, and to generate a velocity model based on the solution to the velocity model equation, and to determine location of a hydrocarbon reservoir in the under-ocean floor explored structure based on strong velocity or anisotropic parameter variations in the velocity model; and a display configured to display the velocity model, wherein the relaxing the dependency on the low frequency reflections includes splitting an initial velocity model m into a long wavelength component $m_o$ and a short wavelength component $\delta m$, and updating the long wavelength component $m_o$ while the short wavelength component $\delta m$ is fixed.

14. The system according to claim 13, wherein
the processor is further configured to update long wavelength component of the full waveform inversion function generated velocity model affecting the reflected signals when relaxing the dependency on low frequency reflections.

15. The system according to claim 13, wherein
the processor is further configured to implement a nonlinear iterative relaxation process, such that the processor is still further configured to
obtain the long wavelength component of the reflected signals,
update the short wavelength component using the long wavelength component;

fix the short wavelength component;
update the long wavelength component using the fixed short wavelength component, and
generate the updated velocity model using the updated short wavelength component and updated long wavelength component.

16. The system according to claim 15, wherein, when updating the short wavelength component using the long wavelength component the processor evaluates the following expression—

$$\left.\frac{\partial \delta G}{\partial \delta m}\right|_{\delta m}(m_0)(r,\omega,s;x) = \omega^2 G_0(r,\omega;x) G_0(y,\omega;s)$$

where G indicates Green function, that is split into a Green function $G_0$ depending on $m_o$ and a perturbation thereof $\delta G$ depending on $m_o$ and $\delta m$, r is receiver position, s is shot position, $\omega$ is angular frequency and x is a model-related position.

17. The system according to claim 16, wherein
the processor is further configured to use an amplitude migration process to update the short wavelength component using the long wavelength component.

18. The system according to claim 15, wherein
the processor is further configured to use a local optimization scheme to update the long wavelength component when using the fixed short wavelength component.

19. The system according to claim 18, wherein
the processor is further configured to use the local optimization scheme by evaluating the following expressions $$R(r,\omega;s) = G_{obs}(r,\omega;s) - G_{cal}(r,\omega;s),$$

and $$\left.\frac{\partial C}{\partial m_0}\right|_{\delta m}(x) = -\int\int dsdr \int d\omega \left.\frac{\partial \delta G}{\partial m_0(x)}\right|_{\delta m}^*(r,\omega,s;x) R(r,\omega;s)$$

where $G_{obs}$ is an observed Green function, $G_{cal}$ is a calculated Green function, * denotes complex conjugated form of a function and R are residuals.

20. A system for exploring under-ocean floor environments, the system comprising:

a plurality of sources configured to generate a series of source signals and to inject the source signals into an under-ocean floor explored structure;

a plurality of receivers configured to detect and record direct signals, reflected signals, and refracted signals corresponding to the source signals;

a processor configured to
solve a velocity model equation using a full waveform inversion function with respect to the direct signals, reflected signals and refracted signals to minimize a least square misfit function,
split the full waveform inversion velocity model m into long wavelength components $m_o$ of the reflected signals, and short wavelength components $\delta m$ of the reflected signals,
update the short wavelength components of the reflected signals, and the long wavelength components of the reflected signals using an iterative relaxation process,
generate an iterative velocity model based on the solution to the velocity model equation that includes the iterated long wavelength components of the reflected signals and the iterated short wavelength components of the reflected signals, and determine location of a hydrocarbon reservoir in the under-ocean floor explored structure based on strong velocity or anisotropic parameter variations in the velocity model; and a display configured to display the velocity model, wherein the iterative relaxation process includes updating the iterated long wavelength component $m_o$ while the short wavelength component $\delta m$ is fixed.

21. The system according to claim 20, wherein, when updating of the long wavelength components of the reflected signals, the processor evaluates the following expression $$\frac{\partial \delta G}{\partial m_0}\bigg|_{\delta m} (m_0, \delta m)(r, \omega, s; x) =$$
$$\omega^2 \int dy \bigg( \frac{\partial G_0}{\partial m_0}(r, \omega; y) G(y, \omega; s) + G_0(r, \omega; y) \frac{\partial G}{\partial m_0}(y, \omega; s) \bigg) \delta m(y)$$

where G indicates Green function that is split into a Green function $G_0$ depending on $m_o$ and a perturbation thereof $\delta G$ depending on $m_o$ and $\delta m$, r is receiver position, s is shot position, $\omega$ is angular frequency and x is a model-related position.

22. The system according to claim 20, wherein the processor is further configured to obtain the initial long wavelength component, obtain the initial short wavelength component using the initial long wavelength component, fix the short wavelength component, update the long wavelength components using a local optimization scheme and then fixing the long wavelength component, and generate the updated velocity model using the updated long wavelength component and short wavelength component in the full waveform inversion function.

23. The system according to claim 22, wherein the processor is further configured to use a true amplitude migration process when obtaining the initial short wavelength component.

24. The system according to claim 20, wherein the processor is further configured to determine a set of residual data by evaluating the following expression $$R(r,\omega;s) = G_{obs}(r,\omega;s) - G_{cal}(r,\omega;s),$$

and wherein the processor is still further configured to obtain a gradient of the cost function by using the determined residual data and evaluating the following expression—

$$\frac{\partial C}{\partial m_0}\bigg|_{\delta m}(x) = -\int\int dsdr \int d\omega \frac{\partial \delta G}{\partial m_0(x)}\bigg|_{\delta m}^{*}(r, \omega, s; x) R(r, \omega; s),$$

where $G_{obs}$ is an observed Green function, $G_{cal}$ is a calculated Green function, * denotes complex conjugated form of a function and C is a cost function, and wherein the processor is still further configured to update the velocity model by using the results of the gradient cost function and evaluating the following expression—

$$\frac{\partial \delta G}{\partial m_0}\bigg|_{\delta m}(m_0, \delta m)(r, \omega, s; x) =$$
$$\omega^2 \int dy \bigg( \frac{\partial G_0}{\partial m_0}(r, \omega; y) G(y, \omega; s) + G_0(r, \omega; y) \frac{\partial G}{\partial m_0}(y, \omega; s) \bigg) \delta m(y)$$

where G indicates Green function, r is receiver position, s is shot position, $\omega$ is angular frequency and x is a model-related position.

* * * * *